United States Patent
Neumann et al.

(10) Patent No.: US 11,913,528 B1
(45) Date of Patent: Feb. 27, 2024

(54) MULTI-MODE CONTINUOUSLY VARIABLE TRANSMISSION ASSEMBLY WITH DROP SET ARRANGEMENT

(71) Applicant: Deere & Company, Moline, IL (US)

(72) Inventors: Clayton P. Neumann, Cedar Falls, IA (US); Kevin R. King, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/050,683

(22) Filed: Oct. 28, 2022

(51) Int. Cl.
  *F16H 37/08* (2006.01)
  *F16H 15/50* (2006.01)
  *F16H 37/02* (2006.01)

(52) U.S. Cl.
  CPC ........... *F16H 37/086* (2013.01); *F16H 15/50* (2013.01); *F16H 37/02* (2013.01); *F16H 2037/0886* (2013.01)

(58) Field of Classification Search
  CPC ........... F16H 37/086; F16H 2037/0886; F16H 15/50; F16H 37/02
  See application file for complete search history.

(56) References Cited

U.S. PATENT DOCUMENTS

| | | |
|---|---|---|
| 3,214,987 A | 11/1965 | August et al. |
| 3,626,787 A | 12/1971 | Singer |
| 3,651,904 A | 3/1972 | Snoy et al. |
| 3,714,845 A | 2/1973 | Mooney, Jr. |
| 3,783,711 A | 1/1974 | Orshansky, Jr. |
| 4,090,414 A | 5/1978 | White |
| 4,164,155 A | 8/1979 | Nolan et al. |
| 4,164,156 A | 8/1979 | Reed |
| 5,156,577 A | 10/1992 | Fredriksen et al. |
| 5,277,286 A | 1/1994 | Yamamoto et al. |

(Continued)

FOREIGN PATENT DOCUMENTS

| | | |
|---|---|---|
| AT | 11545 U1 | 12/2010 |
| CN | 101255907 B | 10/2013 |

(Continued)

OTHER PUBLICATIONS

German Search Report issued in application No. DE102022210864.7 dated Jun. 23, 2023. (12 pages).

(Continued)

*Primary Examiner* — Justin Holmes
(74) *Attorney, Agent, or Firm* — KLINTWORTH & ROZENBLAT IP LLP

(57) ABSTRACT

A multi-mode CVT for a work vehicle powertrain has a continuously variable power source (CVP), an input arrangement with an input shaft receiving engine power, a variator arrangement with a variator shaft supporting a planetary set, a drop set arrangement with a drop set shaft, and an output arrangement with an output shaft supporting an output component. The input, variator, and drop set arrangements include clutch components with the clutch(es) of the drop set arrangement transmitting CVP power or combined CVP and engine power to the output arrangement to provide a selective gear reduction for transmission of an output power according to a plurality of transmission modes, including a CVP-only mode and a combined engine and CVP split-path mode.

17 Claims, 16 Drawing Sheets

(56) References Cited

U.S. PATENT DOCUMENTS

| | | |
|---|---|---|
| 5,353,662 A | 10/1994 | Vaughters |
| 5,508,574 A | 4/1996 | Vlock |
| 5,611,245 A | 3/1997 | McKee |
| 5,931,757 A | 8/1999 | Schmidt |
| 6,254,509 B1 | 7/2001 | Meyer |
| 6,394,925 B1 | 5/2002 | Woentner et al. |
| 6,478,705 B1 | 11/2002 | Holmes et al. |
| 6,641,505 B2 | 11/2003 | Sayman et al. |
| 6,684,148 B2 | 1/2004 | Chess |
| 7,008,342 B2 | 3/2006 | Dyck et al. |
| 7,252,611 B2 | 8/2007 | Raghavan et al. |
| 7,294,079 B2 | 11/2007 | Raghavan et al. |
| 7,311,627 B2 | 12/2007 | Tarasinski |
| 7,329,201 B2 | 2/2008 | Raghavan et al. |
| 7,367,911 B2 | 5/2008 | Raghavan et al. |
| 7,377,876 B2 | 5/2008 | Yang |
| 7,399,246 B2 | 7/2008 | Holmes et al. |
| 7,465,251 B2 | 12/2008 | Zhang |
| 7,473,201 B2 | 1/2009 | Raghavan et al. |
| 7,479,081 B2 | 1/2009 | Holmes |
| 7,491,144 B2 | 2/2009 | Conlon |
| 7,611,433 B2 | 11/2009 | Forsyth |
| 7,901,314 B2 | 3/2011 | Salvaire et al. |
| 7,942,776 B2 | 5/2011 | Conlon |
| 8,234,956 B2 | 8/2012 | Love et al. |
| 8,257,213 B2 | 9/2012 | Komada et al. |
| 8,439,787 B2 | 5/2013 | Salamandra et al. |
| 8,469,127 B2 | 6/2013 | Tarasinski et al. |
| 8,500,585 B2 | 8/2013 | Kim et al. |
| 8,573,340 B2 | 11/2013 | Tarasinski et al. |
| 8,579,751 B2 | 11/2013 | Phillips |
| 8,596,157 B2 | 12/2013 | Vu |
| 8,660,724 B2 | 2/2014 | Tarasinski et al. |
| 8,672,069 B2 | 3/2014 | Cherney et al. |
| 8,734,281 B2 | 5/2014 | Ai et al. |
| 8,747,266 B2 | 6/2014 | Aitzetmueller et al. |
| 8,784,246 B2 | 7/2014 | Treichel et al. |
| 8,790,202 B2 | 7/2014 | Sakai et al. |
| 8,944,194 B2 | 2/2015 | Glaser et al. |
| 8,986,162 B2 | 3/2015 | Dix et al. |
| 9,002,560 B2 | 4/2015 | Hasegawa |
| 9,097,342 B2 | 8/2015 | Dix et al. |
| 9,206,885 B2 | 12/2015 | Rekow et al. |
| 9,487,073 B2 | 11/2016 | Love et al. |
| 9,562,592 B2 | 2/2017 | Rekow et al. |
| 9,840,165 B2 | 12/2017 | Cox |
| 9,840,827 B2 | 12/2017 | Miyamoto et al. |
| 9,944,163 B2 | 4/2018 | McKinzie |
| 9,981,665 B2 | 5/2018 | Rekow et al. |
| 10,029,694 B2 | 7/2018 | Sharp et al. |
| 10,119,598 B2 | 11/2018 | Rekow et al. |
| 10,619,711 B2 | 4/2020 | Fliearman et al. |
| 10,647,193 B2 | 5/2020 | McKinzie et al. |
| 10,655,710 B2 | 5/2020 | Rekow et al. |
| 10,670,124 B2 | 6/2020 | Rekow et al. |
| 10,738,868 B2 | 8/2020 | McKinzie et al. |
| 10,975,959 B2 | 4/2021 | McKinzie et al. |
| 11,052,747 B2 | 7/2021 | Ore |
| 11,091,018 B2 | 8/2021 | Ore et al. |
| 11,137,052 B2 | 10/2021 | Ore et al. |
| 11,325,459 B2 | 5/2022 | Ore |
| 11,413,960 B2 | 8/2022 | Bindl et al. |
| 11,535,234 B2 | 12/2022 | Duffy et al. |
| 11,572,672 B2 | 2/2023 | Vilar et al. |
| 2001/0016536 A1 | 8/2001 | Minowa et al. |
| 2003/0186769 A1 | 10/2003 | Ai et al. |
| 2004/0094381 A1 | 5/2004 | Versteyhe |
| 2004/0172184 A1 | 9/2004 | Vukovich et al. |
| 2005/0036894 A1 | 2/2005 | Oguri |
| 2005/0049100 A1 | 3/2005 | Ai et al. |
| 2006/0046886 A1 | 3/2006 | Holmes et al. |
| 2006/0111212 A9 | 5/2006 | Ai et al. |
| 2006/0142104 A1 | 6/2006 | Saller |
| 2006/0276291 A1 | 12/2006 | Fabry et al. |
| 2007/0021256 A1 | 1/2007 | Klemen et al. |
| 2007/0021257 A1 | 1/2007 | Klemen et al. |
| 2007/0249455 A1 | 10/2007 | Hasegawa et al. |
| 2008/0171626 A1 | 7/2008 | Pollman |
| 2009/0250278 A1 | 10/2009 | Kawasaki et al. |
| 2010/0048338 A1 | 2/2010 | Si |
| 2010/0179009 A1 | 7/2010 | Wittkopp et al. |
| 2010/0261565 A1 | 10/2010 | Ai et al. |
| 2011/0130235 A1 | 6/2011 | Phillips |
| 2012/0157254 A1 | 6/2012 | Aitzetmueller et al. |
| 2013/0023370 A1 | 1/2013 | Grad et al. |
| 2013/0123055 A1 | 5/2013 | Mattsson et al. |
| 2013/0173126 A1 | 7/2013 | Ruebsam |
| 2013/0211655 A1 | 8/2013 | Ogata et al. |
| 2013/0231815 A1 | 9/2013 | Tanishima et al. |
| 2013/0325238 A1 | 12/2013 | Kato et al. |
| 2014/0018201 A1 | 1/2014 | Tolksdorf |
| 2014/0128196 A1 | 5/2014 | Rintoo |
| 2014/0128217 A1 | 5/2014 | Tabata et al. |
| 2014/0248986 A1 | 9/2014 | Weeramantry et al. |
| 2014/0315685 A1 | 10/2014 | Hofler |
| 2015/0006007 A1 | 1/2015 | Kitahata et al. |
| 2015/0072823 A1 | 3/2015 | Rintoo |
| 2015/0142232 A1 | 5/2015 | Tabata et al. |
| 2015/0142282 A1 | 5/2015 | Lee et al. |
| 2015/0183436 A1 | 7/2015 | Rekow et al. |
| 2015/0184726 A1 | 7/2015 | Rekow et al. |
| 2015/0292608 A1 | 10/2015 | McKinzie |
| 2016/0090091 A1 | 3/2016 | Gugel et al. |
| 2016/0201295 A1 | 7/2016 | Kishimoto et al. |
| 2016/0272059 A1 | 9/2016 | Watanabe et al. |
| 2017/0066447 A1 | 3/2017 | Hertel et al. |
| 2017/0102059 A1 | 4/2017 | Rekow et al. |
| 2017/0129477 A1 | 5/2017 | Ideshio et al. |
| 2017/0203646 A1 | 7/2017 | Mueller et al. |
| 2017/0284508 A1 | 10/2017 | Devreese |
| 2017/0284517 A1 | 10/2017 | Rekow et al. |
| 2017/0328453 A1 | 11/2017 | McKinzie et al. |
| 2018/0022353 A1 | 1/2018 | Thompson et al. |
| 2018/0043764 A1 | 2/2018 | McKinzie et al. |
| 2018/0056982 A1 | 3/2018 | Endo et al. |
| 2018/0149247 A1 | 5/2018 | Rekow et al. |
| 2018/0298993 A1 | 10/2018 | Fliearman et al. |
| 2018/0347416 A1 | 12/2018 | Komori et al. |
| 2019/0111773 A1 | 4/2019 | Nishikawa et al. |
| 2019/0118642 A1 | 4/2019 | Cho et al. |
| 2019/0337376 A1 | 11/2019 | Ore |
| 2019/0344654 A1 | 11/2019 | Kaltenbach et al. |
| 2019/0346036 A1* | 11/2019 | Ore .................. B60K 6/08 |
| 2019/0389298 A1 | 12/2019 | Kaltenbach et al. |
| 2020/0180347 A1 | 6/2020 | Ederer et al. |
| 2020/0309258 A1 | 10/2020 | McKinzie et al. |
| 2021/0062900 A1* | 3/2021 | Ore .................. F16H 3/728 |
| 2022/0111721 A1 | 4/2022 | Ore |
| 2022/0227351 A1 | 7/2022 | McKinzie et al. |

FOREIGN PATENT DOCUMENTS

| | | |
|---|---|---|
| CN | 102844588 B | 5/2015 |
| DE | 1173348 B | 7/1964 |
| DE | 4010919 A1 | 10/1991 |
| DE | 4131572 A1 | 3/1993 |
| DE | 19621200 A1 | 11/1997 |
| DE | 19954636 A1 | 5/2001 |
| DE | 201500200973 | 5/2001 |
| DE | 10128076 A1 | 12/2002 |
| DE | 10319252 A1 | 11/2004 |
| DE | 102008032320 A1 | 1/2010 |
| DE | 202009007972 U1 | 5/2010 |
| DE | 10201102210 A1 | 3/2011 |
| DE | 10201105868 | 3/2011 |
| DE | 102010021846 A1 | 12/2011 |
| DE | 102011102184 A1 | 7/2012 |
| DE | 112006002537 B4 | 8/2012 |
| DE | 102012216781 A1 | 3/2013 |
| DE | 102011115002 A1 | 4/2013 |
| DE | 102013200158 A1 | 7/2014 |
| DE | 102013009649 A1 | 12/2014 |
| DE | 102013220167 A1 | 4/2015 |
| DE | 202015102282 U1 | 5/2015 |

(56) References Cited

FOREIGN PATENT DOCUMENTS

| | | |
|---|---|---|
| DE | 102014225298 A1 | 7/2015 |
| DE | 102015111119 A1 | 1/2016 |
| DE | 102015215461 A1 | 2/2016 |
| DE | 102015220635 A1 | 5/2016 |
| DE | 102015205932 A1 | 10/2016 |
| DE | 112006000524 B4 | 2/2017 |
| DE | 102016116324 A1 | 3/2017 |
| DE | 102016204727 A1 | 9/2017 |
| DE | 102006041160 B4 | 5/2018 |
| DE | 102008030521 A1 | 9/2018 |
| DE | 102018108510 A8 | 1/2019 |
| DE | 102018209940 A8 | 1/2019 |
| DE | 102018212712 A1 | 1/2019 |
| DE | 102010026460 B4 | 5/2019 |
| DE | 102019204706 A1 | 11/2019 |
| DE | 102019205211 A1 | 11/2019 |
| DE | 102018213871 A1 | 2/2020 |
| DE | 102020003597 A1 | 9/2020 |
| DE | 102020209003 A1 | 3/2021 |
| DE | 102020211888 A1 | 5/2021 |
| DE | 102020213675 A1 | 5/2021 |
| DE | 102020215219 A1 | 6/2021 |
| DE | 102016120965 B4 | 3/2022 |
| EP | 805059 B1 | 8/2000 |
| EP | 1099882 B1 | 3/2004 |
| EP | 1707416 B1 | 8/2007 |
| EP | 2466168 A1 | 6/2012 |
| EP | 2466169 B1 | 6/2014 |
| EP | 2682531 B1 | 9/2015 |
| EP | 2855226 B1 | 12/2017 |
| EP | 2832567 B1 | 6/2018 |
| EP | 2631144 B1 | 9/2018 |
| JP | 6462174 B1 | 1/2019 |
| WO | WO2007017975 A1 | 2/2007 |
| WO | WO2008019799 A2 | 2/2008 |
| WO | WO2011092643 A1 | 8/2011 |
| WO | WO2012171812 A1 | 12/2012 |
| WO | WO2017107848 A1 | 6/2017 |
| WO | 2021115580 A1 | 6/2021 |

OTHER PUBLICATIONS

German Search Report issued in application No. DE102022210867.1 dated Jun. 30, 2023. (14 pages).
Schmetz, Roland, Electromechanische Traktorgetriebe Getriebe mit Zukunft, Electromechanical Tractor Units—Gearboxes with a Future, Landtechnik, Agricultural Engineering, vol. 54; Issue 2; pp. 72-73, Feb. 1999.
John M. Miller, Hybrid Electric Vehicle Propulsion System Architectures of the e-CVT Type, IEEE Transactions on Power Electronics, vol. 21, No. 3, May 2006.
Jian Dong, Zuomin Dong, Curran Crawford, Review of Continuously Variable Transmission Powertrain System for Hybrid Electric Vehicles, Proceedings of the ASME 2011 International Mechanical Engineering Congress & Exposition, IMECE2011-63321, Nov. 11-17, 2011.
USPTO, Ex Parte Quayle Action in U.S. Appl. No. 17/171,856 issued Oct. 11, 2022.
USPTO, Final Office Action in U.S. Appl. No. 14/249,258 dated Apr. 21, 2017.
USPTO, Final Office Action in U.S. Appl. No. 15/664,289 dated Dec. 13, 2018.
USPTO, Final Office Action in U.S. Appl. No. 15/971,867 dated Jun. 24, 2020.
USPTO, Final Office Action in U.S. Appl. No. 16/555,913 dated Apr. 20, 2021.
USPTO, Non-Final Office Action in U.S. Appl. No. 14/249,258 dated Aug. 22, 2017.
USPTO, Non-Final Office Action in U.S. Appl. No. 14/249,258 dated Oct. 17, 2016.
USPTO, Non-Final Office Action in U.S. Appl. No. 14/536,097 dated Sep. 25, 2017.
USPTO, Non-Final Office Action in U.S. Appl. No. 15/485,911 dated Feb. 8, 2019.
USPTO, Non-Final Office Action in U.S. Appl. No. 15/628,979 dated Nov. 5, 2019.
USPTO, Non-Final Office Action in U.S. Appl. No. 15/664,289 dated Jul. 26, 2018.
USPTO, Non-Final Office Action in U.S. Appl. No. 15/793,522 dated Apr. 18, 20219.
USPTO, Non-Final Office Action in U.S. Appl. No. 15/879,796 dated Aug. 23, 2019.
USPTO, Non-Final Office Action in U.S. Appl. No. 15/971,867 dated Dec. 24, 2020.
USPTO, Non-Final Office Action in U.S. Appl. No. 15/971,867 dated Dec. 12, 2019.
USPTO, Non-Final Office Action in U.S. Appl. No. 16/371,598 dated Jul. 21, 2020.
USPTO, Non-Final Office Action in U.S. Appl. No. 16/555,913 dated Jan. 4, 2021.
USPTO, Non-Final Office Action in U.S. Appl. No. 17/066,746 dated Oct. 26, 2021.
USPTO, Non-Final Office Action in U.S. Appl. No. 17/154,729 dated Jul. 15, 2022.
USPTO, Non-Final Office Action in U.S. Appl. No. 17/538,691 dated Sep. 15, 2022.
USPTO, Non-Final Office Action in U.S. Appl. No. 17/559,496 dated Aug. 31, 2022.
Deere & Company, Utility U.S. Appl. No. 16/670,210, filed Oct. 31, 2019.
Deere & Company, Utility U.S. Appl. No. 16/946,685, filed Jul. 1, 2020.
Deere & Company, Utility U.S. Appl. No. 17/066,746, filed Oct. 9, 2020.
Deere & Company, Utility U.S. Appl. No. 17/154,729, filed Jan. 21, 2021.
Deere & Company, Utility U.S. Appl. No. 17/171,856, filed Feb. 9, 2021.
Deere & Company, Utility U.S. Appl. No. 17/538,691, filed Nov. 30, 2021.
Deere & Company, Utility U.S. Appl. No. 17/559,496, filed Dec. 22, 2021.
Deere & Company, Utility U.S. Appl. No. 17/559,693, filed Dec. 22, 2021.
Deere & Company, Utility U.S. Appl. No. 17/585,726, filed Jan. 27, 2022.
CNIPA Office Action for Application No. 201510165982.4 dated Aug. 9, 2018, Serial Notice No. 2018080601675890.
German Search Report for counterpart application No. 10215206174.4 dated Jul. 16, 2015.
German Search Report for counterpart application No. 102018203670.5 dated Dec. 20, 2018.
German Search Report for counterpart application No. 102018210616.9 dated Feb. 1, 2019.
German Search Report for counterpart application No. 102018209939.1 dated Feb. 27, 2019.
German Search Report for counterpart application No. 102018209940.5 dated Feb. 28, 2019.
German Search Report for counterpart application No. 102018212712.3 dated Apr. 12, 2019.
German Search Report for counterpart application No. 102019205211.8 dated Sep. 5, 2019.
German Search Report for counterpart application No. 102019204706.8 dated Dec. 17, 2019.
German Search Report for counterpart application No. 102020202651.3 dated Sep. 1, 2020.
German Search Report for counterpart application No. 102020213675.0 dated Mar. 17, 2021.
German Search Report for counterpart application No. 102020209003.3 dated Apr. 15, 2021.
German Search Report for counterpart application No. 102017220666.7 dated May 28, 2021.
German Search Report for counterpart application No. 102021209495.3 dated Jan. 11, 2022.

(56) References Cited

OTHER PUBLICATIONS

German Search Report for counterpart application No. 102021212506.9 dated Jun. 20, 2022.
German Search Report for counterpart application No. 102021214746.1 dated Jun. 30, 2022.
German Search Report issued in application No. DE102022210721.7 dated Jun. 1, 2023. (14 pages).
German Search Report issued in application No. DE102022210460.9 with translation, dated May 8, 2023. (29 pages).
European Search Report for counterpart application No. 20205965.5 dated Jul. 28, 2021.

\* cited by examiner

|    | C1 | C2 | C3 | C4 | C5 | CF | CR |
|----|----|----|----|----|----|----|----|
| R5 |    |    |    |    | ✕  |    | ✕  |
| R4 |    |    |    | ✕  |    |    | ✕  |
| R3 |    |    | ✕  |    |    |    | ✕  |
| R2 |    | ✕  |    |    |    |    | ✕  |
| F1 | ✕  | ✕  |    |    |    |    |    |
| F2 |    | ✕  |    |    |    | ✕  |    |
| F3 |    |    | ✕  |    |    | ✕  |    |
| F4 |    |    |    | ✕  |    | ✕  |    |
| F5 |    |    |    |    | ✕  | ✕  |    |

FIG. 2A

MULTI-MODE CONTINUOUSLY VARIABLE TRANSMISSION ASSEMBLY WITH DROP SET ARRANGEMENT

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicle powertrains providing continuously variable power in multiple modes of operation.

BACKGROUND OF THE DISCLOSURE

Work vehicles, such as those employed in various industries (e.g., agriculture, construction, forestry, mining and the like) may be constructed to harness the power of both internal combustion engines (e.g., diesel engines) and continuously variable power sources (CVPs) (e.g., electric and/or hydraulic motors). (Such CVPs may also be referred to as "infinitely variable power" sources.) Transmission assemblies may serve to distribute the power, at one or more gear ratios, to operating components of the work vehicle (e.g., traction devices, implements and the like). Further, the transmissions themselves may incorporate one or more of the CVPs, and such a continuously variable transmission (CVT) may be controlled to provide single format and/or dual format power, namely, mechanical-only power from the engine or CVP-only power from the CVP(s) and/or split-path power combined from both the engine and the CVP(s). (Such CVTs may also be referred to as "infinitely variable transmissions.")

SUMMARY OF THE DISCLOSURE

The disclosure provides a multi-mode continuously variable transmission (CVT) for a work vehicle powertrain having an engine rotating an engine shaft to deliver engine power to the CVT. The CVT includes: a continuously variable power source (CVP) generating CVP power; an input arrangement having an input shaft couplable to the engine shaft to receive the engine power and rotate about an input axis, the input shaft supporting one or more clutch components about the input axis; a variator arrangement having a variator shaft rotating about a variator axis and supporting a planetary set and one or more clutch components about the variator axis; a drop set arrangement having a drop set shaft rotating about a drop set axis and supporting one or more clutch components about the drop set axis; and an output arrangement having an output shaft rotating about an output axis and supporting one or more output components about the output shaft. The input arrangement, the variator arrangement and the drop set arrangement provide a selective gear reduction for transmission of an output power according to a plurality of transmission modes. In a CVP-only mode: a clutch of the input arrangement transmits the CVP power to the planetary set of the variator arrangement; a clutch of the variator arrangement decouples the engine power from the planetary set of the variator arrangement; a clutch of the drop set arrangement transmits the CVP power to the output arrangement; and the output arrangement outputs the CVP power as the output power. In a split-path mode: a clutch of the input arrangement transmits the CVP power to the planetary set of the variator arrangement; a clutch of the variator arrangement transmits the engine power to the planetary set of the variator arrangement where the planetary set combines the CVP power and the engine power; a clutch of the drop set arrangement transmits the combined CVP and engine power to the output arrangement; and the output arrangement outputs the combined CVP and engine power as the output power.

In various additional aspects, the CVP-only mode is alternately operable as a first forward mode of the CVT and a first reverse mode of the CVT by alternatively operating the CVP in forward and reverse clock directions while maintaining engagement of the clutch of the input arrangement that transmits the CVP power to the planetary set of the variator arrangement. The first forward mode and the first reverse mode of the CVT provide creeper and powered-zero operation in respective forward and reverse travel directions.

In other aspects, the CVP includes a first continuously variable machine (CVM) and a second CVM, and the first CVM and the second CVM are electric machines. The second CVM is coupled to the input arrangement by a damper mechanism. The damper mechanism includes a compliant member that upon reaching a threshold torque value provides relative rotation of a first portion of the damper coupled to a component of the second CVM and a second portion of the damper coupled to a component of the input arrangement that transmits CVP power to the planetary set of the variator arrangement. In one or more of the plurality of transmission modes, a clutch of the input arrangement transmits a portion of the engine power to the first CVM, the first CVM provides electrical power to the second CVM, and the second CVM provides the CVP power.

In still other aspects, the CVT also includes a pump drive arrangement having a hydraulic pump, which is mounted to a pump pad of a transmission housing containing, at least in part, the CVT, and a drive gear coupled to the input shaft to receive engine power from the engine to drive the hydraulic pump. The pump drive arrangement includes a first pump drive assembly and a second pump drive assembly. The first pump drive assembly includes the hydraulic pump and the drive gear, and the second pump drive assembly includes a second hydraulic pump and a second drive gear. The second hydraulic pump is mounted to a second pump pad of the transmission housing, and the second drive gear is coupled to the input shaft to receive engine power from the engine to drive the second hydraulic pump. The pump drive arrangement also includes a third pump drive assembly including a third pump mounted within the transmission housing and driven by the second drive gear.

In yet other aspects, the input arrangement includes a clutch C1 that has a component engaged with the second CVM continuously so as to transmit at least a portion of the CVP power to the planetary set of the variator arrangement in all modes of the CVT. The clutch C1 is engaged when in the CVP-only mode of the CVT so to transmit another portion of the CVP power to the planetary set of the variator arrangement via a different component of the planetary set than the other portion of the CVP power. The input arrangement also includes a clutch CR that has a component coupled to the input shaft for corotation with the input shaft. The clutch C1 includes a component that is coupled to a first hollow shaft supported concentrically about the input shaft for relative rotation about the input axis. The clutch C1 engages a second hollow shaft supported concentrically about the first hollow shaft for relative rotation about the input axis in one or modes of the CVT. Alternatively, the clutch CR engages the second hollow shaft in one or more other modes of the CVT.

In other aspects, the variator arrangement includes a single clutch CF having a component that is coupled to the variator shaft for corotation with the variator shaft about the variator axis. The planetary set of the variator arrangement is a double planetary set having a first sun gear S1 and a first planet carrier PC1 and a second sun gear S2 and a second planet carrier PC2. The second planet carrier PC2 is coupled to the variator shaft for corotation with the variator shaft about the variator axis. The first sun gear S1 is supported concentrically about the variator shaft for relative rotation about the variator axis and coupled to the second sun gear S2 for corotation about the variator axis. The first sun gear S1 is supported concentrically about the variator shaft and coupled to a gear coupled to the clutch C1 of the input arrangement. The drop set arrangement includes a clutch C2, a clutch C3, a clutch C4, and a clutch C5. Each of the clutches C2, C3, C4, C5 have a component coupled to the drop set shaft for corotation about the drop set axis and selectively coupling the drop set shaft to the planetary set of the variator arrangement via one or more gears providing a unique gear ratio associated with one of the plurality of transmission modes. The clutch C2 selectively couples the drop set shaft to the planetary set of the variator arrangement via the first planet carrier PC1 to provide a second forward split-path mode or a second reverse split-path mode of the CVT. The clutch C3 selectively couples the drop set shaft to the planetary set of the variator arrangement via a second ring gear R2 to provide a second forward split-path mode or a second reverse split-path mode of the CVT. The clutch C4 selectively couples the drop set shaft to the planetary set of the variator arrangement via the first planet carrier PC1 to provide a third forward split-path mode or a third reverse split-path mode of the CVT. The clutch C5 selectively couples the drop set shaft to the planetary set of the variator arrangement via the second ring gear R2 to provide a fourth forward split-path mode or a fourth reverse split-path mode of the CVT.

In yet further aspects, the CVT includes a park brake having a friction pack of interleaved plates and discs. Either the plates or the discs are rotationally fixed (e.g., coupled to the transmission housing), and the other of the plates or discs are coupled to the drop set shaft for corotation about the drop set axis.

The present disclosure also provides a work vehicle and work vehicle powertrain having an engine configured to generate rotational engine power through an engine shaft and multi-mode continuously variable transmission (CVT). The CVT includes: a continuously variable power source (CVP) generating CVP power; an input arrangement having an input shaft couplable to the engine shaft to receive the engine power and rotate about an input axis, the input shaft supporting one or more clutch components about the input axis; a variator arrangement having a variator shaft rotating about a variator axis and supporting a planetary set and one or more clutch components about the variator axis; a drop set arrangement having a drop set shaft rotating about a drop set axis and supporting one or more clutch components about the drop set axis; and an output arrangement having an output shaft rotating about an output axis and supporting one or more output components about the output shaft. The input arrangement, the variator arrangement and the drop set arrangement provide a selective gear reduction for transmission of an output power according to a plurality of transmission modes. In a CVP-only mode: a clutch of the input arrangement transmits the CVP power to the planetary set of the variator arrangement; a clutch of the variator arrangement decouples the engine power from the planetary set of the variator arrangement; a clutch of the drop set arrangement transmits the CVP power to the output arrangement; and the output arrangement outputs the CVP power as the output power. In a split-path mode: a clutch of the input arrangement transmits the CVP power to the planetary set of the variator arrangement; a clutch of the variator arrangement transmits the engine power to the planetary set of the variator arrangement where the planetary set combines the CVP power and the engine power; a clutch of the drop set arrangement transmits the combined CVP and engine power to the output arrangement; and the output arrangement outputs the combined CVP and engine power as the output power.

In various aspects of the work vehicle and work vehicle powertrain, the CVP includes a first continuously variable machine (CVM) and a second CVM in which the first CVM and the second CVM are electric machines. The CVT also includes a pump drive arrangement that has a first pump drive assembly with a first hydraulic pump and a first drive gear. The first hydraulic pump is mounted to a first pump pad of the transmission housing, and the first drive gear is coupled to the input shaft to receive engine power from the engine to drive the first hydraulic pump. A second pump drive assembly has a second hydraulic pump and a second drive gear. The second hydraulic pump is mounted to a second pump pad of the transmission housing, and the second drive gear is coupled to the input shaft to receive engine power from the engine to drive the second hydraulic pump. A third pump drive assembly includes a third pump mounted within the transmission housing and driven by the second drive gear.

The details of one or more embodiments are set forth in the accompanying drawings and the description below. Other features and advantages will become apparent from the description, the drawings, and the claims.

BRIEF DESCRIPTION OF THE DRAWINGS

FIG. 2A is a clutch chart indicating the clutches engaged in the various modes of operation for the example multi-mode CVT;

Like reference symbols in the various drawings indicate like elements.

DETAILED DESCRIPTION

Figure 1:
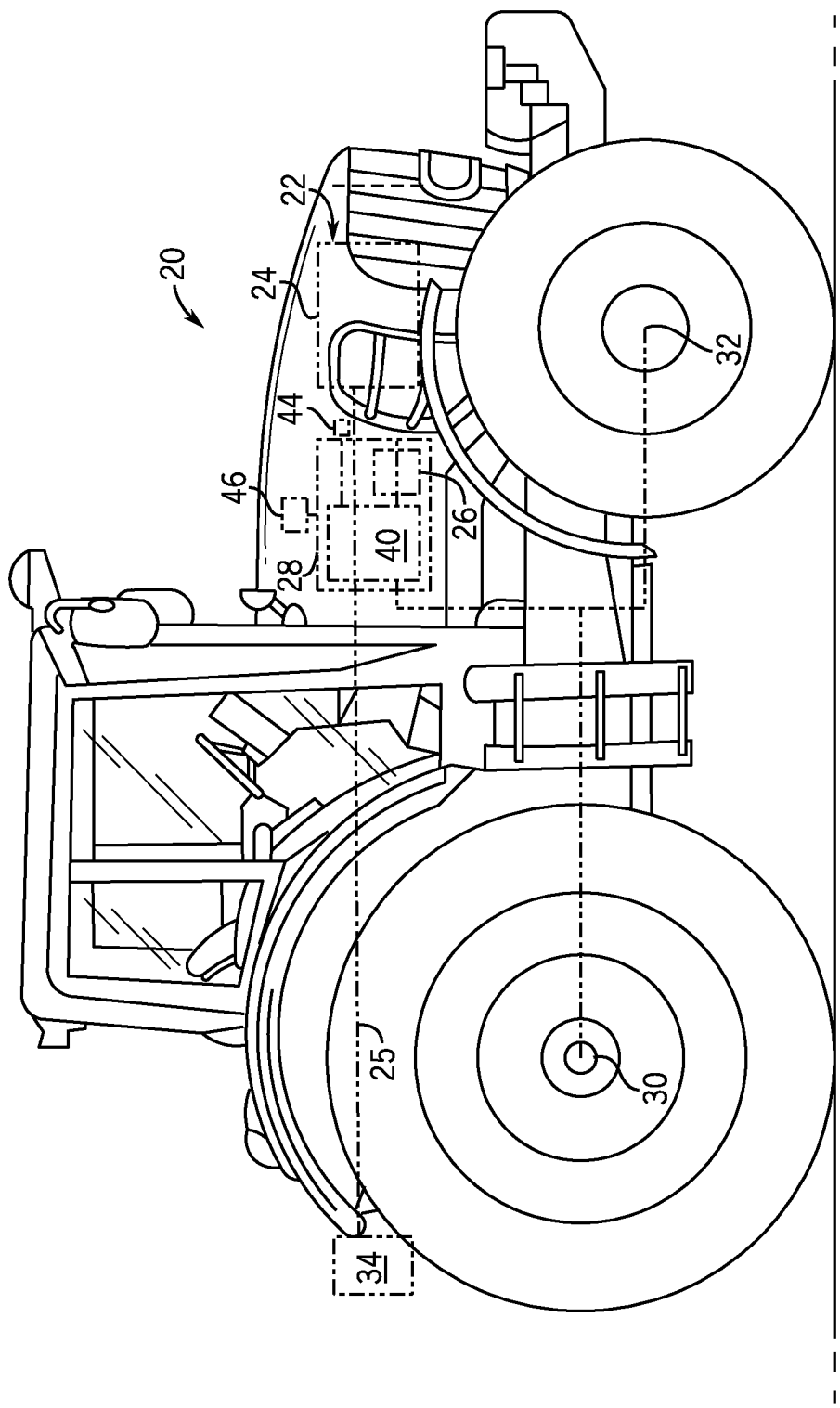
FIG. 1 is a side view of an example work vehicle in which may be incorporated a powertrain having a multi-mode CVT of the present disclosure.

The following describes one or more example embodiments of the disclosed powertrain and work vehicle having a multi-mode CVT, as shown in the accompanying figures of the drawings described briefly above. Various modifications to the example embodiments may be contemplated by one of skill in the art.

As used herein, "direct" or "directly" may be used to indicate power transmission between two system elements without an intervening conversion of the power to another form. For example, power may be considered as "directly" transmitted by an engine to an output component if the power is transferred via a number of shafts, clutches, and gears (e.g., various spur, bevel, summing or other gears) without being converted to a different form by a CVP (e.g., without being converted to electrical or hydraulic power by an electrical generator or a hydraulic pump). In certain configurations, fluidic transfer of rotational power by a torque converter may also be considered "direct."

In contrast, power may not be considered as "directly" transmitted between two system elements if a substantive portion of the power is converted to another form during transmission. For example, power may not be considered as "directly" transmitted between an engine and an output component if a portion of the engine's power is converted to a different form by a CVP, even if that portion is later reconverted to rotational power (e.g., by another CVP) and then recombined with the unconverted engine power (e.g., by a summing planetary gear or other summing assembly).

Also as used herein, "between" may be used with reference to a particular sequence or order of power transmission elements, rather than with regard to physical orientation or placement of the elements. For example, a clutch device may be considered as being "between" an engine and an output component if power is routed to the output component via the clutch device, whether or not the engine and the output component are on physically opposite sides of the clutch device.

For convenience of notation, "component" may be used herein, particularly in the context of a planetary gear set, to indicate an element for transmission of power, such as a sun gear, a ring gear, or a planet gear carrier. Further, references to a "continuously" variable transmission, powertrain, or power source will be understood to also encompass, in various embodiments, configurations including an "infinitely" variable transmission, powertrain, or power source.

In the discussion below, various example configurations of shafts, gears, and other power transmission elements are described. It will be understood that various alternative configurations may be possible within the spirit of this disclosure. For example, various configurations may utilize multiple shafts in place of a single shaft (or a single shaft in place of multiple shafts), may interpose one or more idler gears between various shafts or gears for the transmission of rotational power, and so on.

OVERVIEW

As noted above, work vehicles have been devised to provide tractive and other power from multiple sources, including both internal combustion engines (e.g., diesel engines) and CVPs (e.g., electric and/or hydraulic motors), in various modes of operation. Transmission assemblies themselves may incorporate one or more CVPs internally and be controlled to provide single format and/or dual format power in the form of mechanical-only power from the engine or CVP-only power from the CVP(s) and/or split-path power combined from both the engine and the CVP(s). Such work vehicles and multi-mode CVTs take advantage of the different torques provided by the relatively constant speed (or within a relatively narrow speed band) engine and by the much more variable operational speeds of the CVPs by selectively isolating or combining the power sources and transmitting the selected power through various gear ratios. The resulting output power can thus be tailored to meet specific operating conditions, and the associated speed and torque requirements, of the work vehicles.

Numerous factors render CVTs more or less desirable for given work vehicle applications. One set of factors includes operational considerations. For example, the flexibility and range of the output power for anticipated operating conditions. The overall or specific operating efficiency (power consumption) in one or more of the various modes may also be factors. Another set of factors includes manufacturing, maintenance, and repair considerations. For example, the mechanical complexity and part count of the CVTs will impact these considerations, as will space envelope and packaging constraints. The latter is particularly important for manufacturers of multi-platform work vehicles in which the superstructure (e.g., chassis and other supporting framework) and working components (e.g., power plant) and exterior body panels vary in size and configuration. Efficient manufacturing practices may dictate a universality of parts approach, when possible, so that the like components are utilized across multiple work vehicle platforms. In such instances, components may need to adhere to the same packaging constraints identically or within a prescribed dimensional range for each work vehicle platform. This may be the case whether the components themselves are identical or are varied as needed to meet specific operational requirements of each work vehicle platform.

The CVT of the present disclosure addresses these and other considerations and may provide various advantages. For example, in one or more implementations, the CVT has a configuration that enables a multi-mode, CVP integrated CVT to be utilized across various work vehicle platforms. The CVT is configured to be compact and readily allow for flexibility in the gear ratios and the location of the output shaft, while adhering to tight or exact packaging constraints, such as the mounting location within the engine or transmission compartment of the vehicle and the locations at which the CVT interfaces with the engine shaft and PTO.

The CVT is configured with four primary shafts and relatively few clutches (e.g., seven) that enable various modes with different speeds and torques. The assembly includes a drop set as the third (elevationally second lowest) shaft on which selected gears may be carried that cooperate with other gears of the assembly to provide the various gear ratios needed for the specific or common operational requirements of various work vehicle platforms. The parameters of the gears (e.g., diameters, tooth count, etc.) and the spacing of the drop set shaft from the other shafts may be selected to meet the desired packaging constraints, thus readily meeting a prescribed distance, or fall within a range of allowable distances, between an input axis and an output axis.

As with other CVTs, the CVT of this disclosure provides a plurality of different modes, including: one or more "split-path" power transmission modes in which power flows from the engine and one or more CVPs are combined as well as one or more continuous "series" (e.g., CVP-only) power transmission modes in which the output power originates directly from one or more CVPs but not the engine (except to the extent the engine drives the CVP). In other implementations, the CVT of this disclosure may also provide one or more "mechanical path" (e.g., engine-only)

power transmission modes in which the output power originates from the engine but not a CVP.

In one or more of these modes, the CVT may be operable to maintain an output torque at a very low speed (i.e., "creeper" mode) or at a rotational speed of zero (i.e., "powered-zero" mode). In some implementations, the creeper and powered-zero modes may be CVP-only modes. The CVT may also provide one or more "field modes" for moving the work vehicle at higher speeds. In some implementations, there may be a plurality of field modes, each providing different ground speed ranges for the work vehicle. For example, a first split-path mode, a second split-path mode, etc. may be provided in which the first split-path mode may provide lower output speed ranges than the second split-path mode, and so on. Furthermore, in some embodiments, the CVT may provide at least one forward mode (for moving the work vehicle in a forward travel direction) and at least one reverse mode (for moving the work vehicle is a reverse travel direction). The CVT disclosed herein may facilitate transition between any of the aforementioned modes through the associated arrangement and control of various gear sets, shafts and clutches depending on the needs of a particular work vehicle operation. The CVT of the present disclosure may also provide a plurality of modes that provide different output speed ranges.

In one or more implementations, the engine may provide power via various mechanical (or other) power transmission elements (e.g., various shafts and gears, and so on) to both a first input component of a variator (e.g., a summing planetary gear set) and an input interface (e.g., a splined connection for a rotating shaft) of a first CVP. The first CVP may convert the power to a different form (e.g., electrical or hydraulic power) for transmission to a second CVP to enable the second CVP to provide rotational power to a second input of the variator. A set of transmission elements (e.g., clutches, brakes, etc.) may be provided for selectively changing between the plurality of modes.

MULTI-MODE CVT WITH DROP SET ARRANGEMENT

The disclosed powertrain and CVT may be utilized in a variety of machinery, including various work vehicle and non-vehicular machine platforms, such as those employed in the agriculture, construction, forestry and mining industries. Referring now to FIG. 1, an example work vehicle 20 takes the form of an agricultural tractor. It will be understood, however, that the powertrain 22 and CVT 28 disclosed herein may be configured for incorporation and operation in other manned or autonomous tractor platforms as well as various other work vehicle platforms, including various harvesters, sprayers, skidders, loaders, graders, load-carrying machines, and so on.

As shown, the example work vehicle 20 includes a powertrain 22 having and delivering power from an engine (e.g., diesel engine) 24 (having an engine shaft 25) and/or one or more CVPs 26 through a CVT 28 to a rear axle 30, a front axle 32, and a power take-off (PTO) shaft 34, which may be used to provide rotational power to various onboard and offboard work implements. It will be appreciated that the powertrain 22 may be configured for delivering power to other power sinks without departing from the scope of the present disclosure. The CVT 28 has a transmission housing 36 that at least partially houses a transmission assembly 40 and the one or more CVPs 26. Mounting brackets 38 mount the CVT 28, including CVPs 26, transmission assembly 40 and transmission housing 36, to the chassis or other structural framework of the work vehicle 20. The transmission assembly 40 includes transmission components, such as shafts, gears, clutches, brakes, and/or other components, that interconnect to transfer power from the engine 24 and the one or more CVPs 26 to an output shaft, which forms or may be directly connected to one or both axles 30, 32 (and/or other power sinks of the work vehicle 20). A torque converter or other device may be included between the engine 24 and the CVT 28 as may other power transmission components, such as various chains, belts, and the like. The powertrain 22 may also include various other power sinks, such as one or more hydraulic pumps 44. One or more controllers 46 (e.g., a master controller or dedicated engine and transmission control units) may electronically monitor and control operation of the powertrain 22, the engine 24, and the CVT 28, including the CVP(s) 26.

Figure 2:
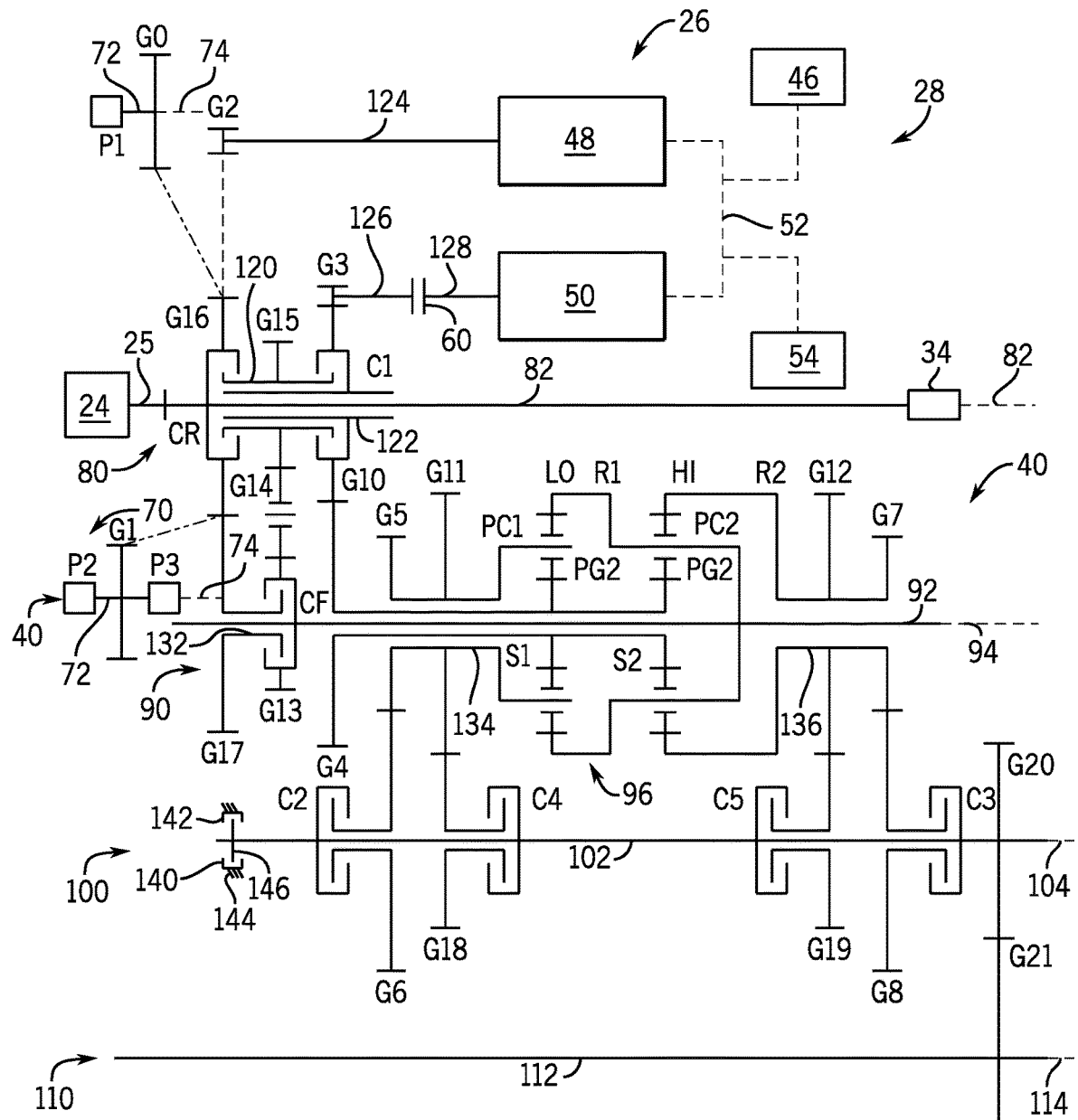
FIG. 2 is a schematic view of a multi-mode CVT according to an example embodiment of the present disclosure.

Referring also to FIG. 2, each CVP 26 is a continuously variable machine (CVM), such as an electrical machine or a hydraulic machine. In the illustrated example, the powertrain 22 and CVT 28 include two CVP machines, referred to herein as a first CVM 48 and a second CVM 50, that are connected via a conduit 52. The engine 24 provides rotational power to the first CVM 48. The first CVM 48 may convert the received power to an alternate form (e.g., electrical or hydraulic power) for transmission over the conduit 52. This converted and transmitted power may be received by the second CVM 50 and then re-converted by the second CVM 50 to provide a rotational power output. Various known control devices, such as the one or more controllers 46, may regulate such conversion, transmission, and re-conversion. In the example implementations described below, the first CVM 48 and the second CVM 50 are electrical machines configured to operate as a motor (to output mechanical power from electrical input power) and as a generator (to output electrical power from mechanical input power), respectively, communicating via the conduit 52, which may be in the form of electrical bus bars or wires.

The first CVM 48 and the second CVM 50 may have non-structural or omitted motor cases or housings since they may be contained entirely within the transmission housing 36. One benefit of this is that cooling and lubricating fluid may be injected or drained back to the transmission assembly 40 anywhere along the length of the transmission housing 36 without requiring external plumbing since the CVMs 48, 50 are both housed therein. The CVMs 48, 50 allow cooling and lubricating fluid to pass between a CVM housing (if present) and the associated stator or between a CVM housing (if present) and the transmission housing 36, or both.

Figure 14:
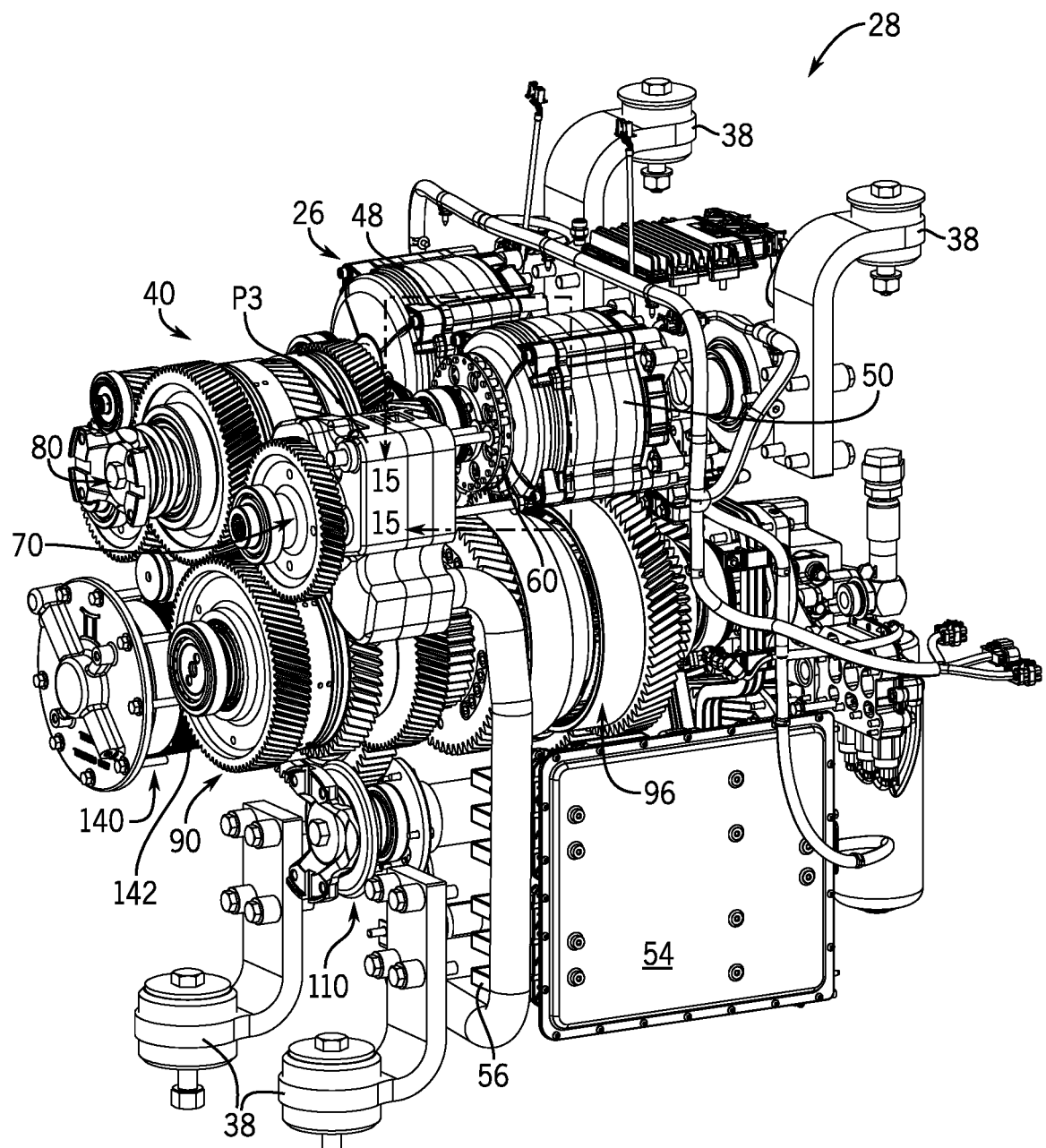
FIG. 14 is a front perspective view thereof shown without a transmission housing.

Another benefit to the embedded or integrated CVP arrangement is that the CVMs 48, 50 may couple electrically to an inverter 54, and/or other electronic or storage components, without requiring an external connection box and cables. Referring to FIG. 14, in one or more example implementations, the inverter 54 is packaged within the transmission housing 36 in an upright (e.g., substantially vertical) orientation, in which the breadth (i.e., the largest dimension) of the inverter 54 is oriented to extend in the direction between top and bottom sides of the transmission housing 36 (taken in the orientation shown in FIG. 14). This orients the inverter 54 so the breadth of the inverter 54 is removed from with width dimension of the CVT 28, thus making it more compact in that dimension, and instead placing the breadth of the inverter 54 in the dimension between the input and output of the CVT 28, which is the dimension that is designed to accommodate variability across different work vehicle platforms. As shown, rigid bus bars 56 electrically couple electrical contacts of the inverter 54 and the CVMs 48, 50, thereby obviating external connections and wiring harnesses, as noted.

Figure 15:
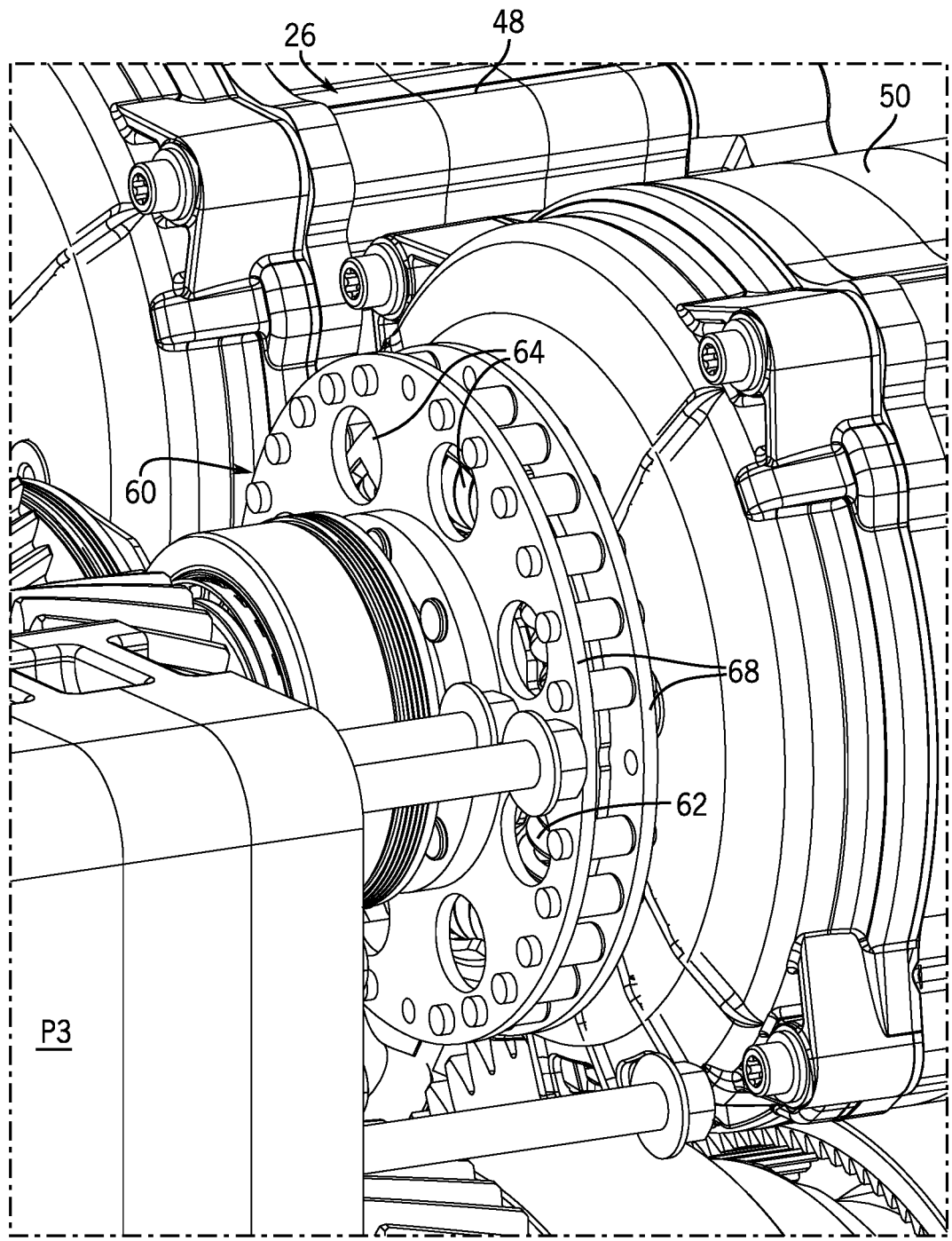
FIG. 15 is a detail view of area 15-15 of FIG. 14 showing an example damper mechanism.

Referring also to FIG. 15, one or more of the CVMs 48, 50 may be in line with a damper mechanism 60 that dampens, or effectively decouples, the vibrational torsion or rotational inertia that would otherwise be transmitted between the transmission assembly 40 and the associated CVM 48, 50, especially, for example, from abrupt changes in rotational speed or torque during shift events of the CVT 28. The CVT 28 may utilize any suitable conventional damper mechanism such as those used in automatic and manual transmissions to smooth shifting in order to enhance operator comfort and reduce damage to transmission and powertrain components. In the example implementation, the damper mechanism 60 is an arc spring damper in which two or more arc-shaped coil springs 62 are arranged with two inner pivot plates 64 and a flange plate (not shown), all components being sandwiched between two outer plates 68 secured at their perimeters by a series of mechanical fasteners. Each pivot plate 64 is coupled (e.g., bolted, splined, welded, etc.) to co-rotate with associated parts of a split shaft (with shafts 124 and 126 described below) associated with the second CVM 50. The coil springs 62 bias the pivot plates 64 against rotation so that during steady state operation rotational torque is transmitted through the damper mechanism 60. Direct, or one-to-one, rotational torque transfer continues until a threshold torque is reached, such as during a transmission shift event, after which the pivot plates 64 may rotate relative to one another to dampen or decouple the torsional inertia. The transient relative rotation continues (e.g., 10-50 degrees) until rotation is physically impeded by contact with a mechanical rotation limiter, possibly arranged on the flange plate. A reduction in torque allows return relative rotation of the pivot plates 64 and a continuation of the normal torque transmission. In various implementations, the damper mechanism may be a series (single stage) or parallel (multi-stage) arc spring arrangement or various arrangements of short, straight coil compression springs or other compliant biasing members. The damper mechanism may also be or include any of various clutch arrangements.

Referring again to FIG. 2, the transmission assembly 40 includes five transmission component arrangements, namely: a pump drive arrangement 70 with a pair of pump drive shafts 72 extending along pump drive axes 74; an input arrangement 80 with an input shaft 82 extending along an input axis 84; a variator arrangement 90 with a variator shaft 92 extending along a variator axis 94 and carrying a variator 96; a drop set arrangement 100 with a drop set shaft 102 extending along a drop set axis 104; and an output arrangement 110 with an output shaft 112 extending along an output axis 114. In some embodiments, the input shaft 82 and axis 84, the variator shaft 92 and axis 94, the drop set shaft 102 and axis 104, and the output shaft 112 and axis 114 may be substantially parallel and spaced apart at a distance from each other. The shafts 82, 92, 102, 112 are secured in position and for rotation about their respective axes 84, 94, 104, 114 by suitable bearings in openings or otherwise mounted to the transmission housing 36 (see, e.g., FIGS. 12 and 13). As will be discussed, the CVT 28 may be configured readily for use with different work vehicle platforms having different packaging requirements. As will also be discussed, the engine 24, the CVPs 26, the variator 96, and the pump drive arrangement 70 may be coupled to the input arrangement 80. Generally, the variator 96 includes components capable of summing the power inputs from the engine 24 and the second CVM 50 for a combined power output to the output shaft 112 in various split-path power transmission modes of the CVT 28.

With continued reference to FIG. 2, the example implementations of the CVT will now be discussed in detail. It should be understood that, while not discussed in detail below, the one or more controllers 46 (e.g., a master controller or dedicated engine and transmission control units) may be operably coupled to the engine 24 and the CVT 28, including the CVPs 26 and the transmission assembly 40, for controlling actuation of selective transmission components utilized to select the different transmission modes of the CVT 28. Also, while not detailed, the selective transmission components may include various clutch components (e.g., clutches, brakes, etc.) having one or more parts that may selectively move between an engaged position, in which one or more other parts are couple together for rotation as a unit, and a disengaged position, in which the component parts are detached to allow relative rotation therebetween.

In the illustrated example, the input arrangement 80 includes a reverse clutch CR and a clutch C1 (which may be considered a "creeper" clutch) as well as outer 120 and inner 122 concentric hollow shafts. As shown, the inner hollow shaft 122 surrounds the input shaft 82 and is supported for rotation about the input axis 84, and the outer hollow shaft 120 surrounds the inner hollow shaft 122 and is also supported for relative rotation. The reverse clutch CR has its fixed part (e.g., first clutch plate) coupled (e.g., welded or splined) to co-rotate with the input shaft 82 and its actuatable part (e.g., second clutch plate) coupled (e.g., welded or splined) to co-rotate with the outer hollow shaft 120 which supports and co-rotates with a gear G15. The clutch C1 has its fixed part coupled (e.g., welded or splined) to co-rotate with the inner hollow shaft 122 and its actuatable part coupled (e.g., welded or splined) to co-rotate with the outer hollow shaft 120 and gear G15. In these clutches CR, C1, and all other clutches described herein, the fixed and actuatable parts may be reversed from that described. A gear G2 is coupled (e.g., welded or splined) to co-rotate with a shaft 124 of the first CVM 48 and mesh with a gear G16 mounted to the fixed part of the reverse clutch CR. A gear G3 is coupled (e.g., welded or splined) to co-rotate with shaft 126 of the split shaft of the second CVM 50 and mesh with gear G10 mounted (e.g., welded or splined) to co-rotate with the fixed part of the clutch C1. As noted above, the split shaft is configured with the damper mechanism 60 disposed between the shafts 126, 128.

The first CVM shaft 124 is connected to the first CVM 48 as an input shaft such that power is transferred from the input shaft 82, through the fixed part of the reverse clutch CR, and through the gears G16, G2 to drive the first CVM 48 as a generator. In this implementation, power is transmitted from the engine 24 to the first CVM 48, such that it is continuously generating power, in each operational mode of the CVT 28. In other implementations, one or more clutches or other disconnects could be incorporated into the input (or other) arrangement to allow the first CVM 48 to be decoupled selectively from the engine 24 in various modes. The split shaft is connected to the second CVM 50 as an output shaft such that, when the clutch C1 is engaged, power is transferred from the second CVM 50, through the gears G3, G10, through the hollow shaft 120 to drive gear G15 to rotate.

In addition to gear G2, the gear G16, which is mounted (e.g., welded or splined) to co-rotate with the reverse clutch CR, also meshes with gears G0 and G1 of the pump drive arrangement 70 which co-rotate with the associated one of the pump drive shafts 72 about the associated pump drive axis 74. The pump drive arrangement 70 includes, or cooperates to drive, the pumps 44, which in the illustrated implementations include three pumps P1, P2, P3 that can be conventional hydraulic pumps. In the described implementations, the pump P3 is located internally within the transmission housing 36 of the CVT 28 about the associated pump drive shaft 72 and axis 74. The pumps P1, P2, however, are external to the transmission housing 36 and mount (e.g., bolted) to pump pads 130 (see FIG. 12) defined at the exterior of the transmission housing 36. The pump drive shafts 72 may extend through openings in the transmission housing 36 at the pump pads 130 so that they may engage with input components of the pumps P1, P2 to receive rotational power. Alternatively, input shafts or other interfacing components may extend into the transmission housing 36 to engage with the pump drive shafts 72 internally within the CVT 28. The location of gears G0, G1 place them in constant mesh with the gear 16 of the reverse clutch CR at the part coupled (e.g., welded or splined) to the input shaft 82 to co-rotate therewith. Consequently, in the described implementations, the pump drive arrangement 70 transmits mechanical power from the engine 24 continuously in all operational modes of the CVT 28. In other implementations, one or more clutches or other disconnects could be incorporated into the pump drive (or other) arrangement to allow one or more of the pumps P1, P2, P3 to be decoupled selectively from the engine 24 in various modes.

In the implementation illustrated in FIG. 2, the engine 24 is coupled to the PTO 34 directly by one or more shafts, including the input shaft 82, so as to continuously provide mechanical power to the PTO 34 in all operational modes of the CVT 28, as with the first CVM 48 and the pump drive arrangement 70. And in a like manner, in various other implementations, one or more clutches or other disconnects could be incorporated into the input (or other) arrangement to allow the PTO 34 to be decoupled selectively from the engine 24 in various modes.

Gears 16, 15, 10 interconnect the input arrangement 80 with the variator arrangement 90. Specifically, gear G10, mounted (e.g., welded or splined) to co-rotate with the fixed part of the clutch C1, meshes with the gear G3 for the second CVM 50 and meshes with a gear G4 on the end of a first sun gear S1 of the variator 96 which is in the form of a hollow sun shaft and includes an annular section concentric with the variator axis 94 and supported about the variator shaft 92 to allow for relative rotation thereto. As a result of this arrangement, the second CVM 50 is configured to provide rotational input to the variator via the split shaft (coaxial shafts 124, 126) and damper mechanism 60, the gears G3, G10, G4, and the first sun gear S1. The configuration of the variator 96 is detailed further below.

The gear G14 is coupled (e.g., welded or splined) to the outer hollow shaft between the reverse clutch CR and the clutch C1 to co-rotate with the outer hollow shaft 120. The gear G14 meshes with an idler gear G14, which is supported for rotation about an idler axis parallel to and spaced apart from the input axis 82. The idler gear G14 meshes with a gear G13 mounted to the fixed part of a forward clutch CF coupled (e.g., welded or splined) to the variator shaft 92 to co-rotate with the forward clutch CF and the variator shaft 92 about the variator axis 94. An actuatable part of the forward clutch CF is mounted to a hollow shaft 132 that is supported about the variator shaft 92 concentric with the variator axis 94 and coupled (e.g., welded or splined) to co-rotate with a gear G17. The gear G17 meshes with the gear G16, which in turn is mounted (e.g., welded or splined) to co-rotate with the fixed part of the reverse clutch CR that is also coupled (e.g., welded or splined) to co-rotate with the input shaft 82.

The forward clutch CF and the reverse clutch CR are alternatively engaged to provide power transmission in opposite clock directions and thereby provide tractive power to drive the work vehicle 20 in forward or reverse travel directions. Due to the presence of the idler gear G14 and the coupling of the fixed part of the forward clutch CF and the variator shaft 92, the variator shaft 92 is rotated in one clock direction (corresponding to reverse travel direction of the work vehicle 20) when the forward clutch CF is disengaged and the reverse clutch CR is engaged. With the reverse clutch CR disengaged and the forward clutch CF engaged, the variator shaft 92 rotates in the clock direction corresponding to the forward travel direction of the work vehicle 20 by inter connection of the gear G17 and the hollow shaft 132 with the variator shaft 92.

The variator 96 in the described implementations is a double or compound planetary set with "HI" and "LO" planetary group sets. The aforementioned first sun gear S1 provides a first input to LO planetary group set, and the variator shaft provides a second input to the HI planetary group set via a fixed coupling with a second carrier PC2. Other variator configurations or multiple variators may be utilized without departing from the scope of this disclosure, and variator members.

In this implementation, the LO planetary gear set includes the first sun gear S1, a first PC1 carrying a plurality of first planet gears PG1, and a first ring gear R1. The first planet gears PG1 may be any suitable single, double or more array of planet gears that mesh with and first sun gear S1 and the first ring gear R1. The first planet gears PG1 may orbit the variator axis 94 as the first carrier PC1 rotates. The HI planetary set includes a second sun gear S2, a second ring gear R2, and a plurality of second planet gears PG2 carried by the second carrier PC2. The second sun gear S2 may be an extension of the first sun gear S1 or otherwise be coupled thereto to co-rotate about the variator axis 94 relative to the variator shaft 92. The second planet gears PG2 mesh with the second sun gear S2 and the second ring gear R2 and orbit the variator axis 94 as the second carrier PC2 rotates. In this implementation of the variator 96, the second carrier PC2 is coupled (e.g., welded or splined) to co-rotate with the variator shaft 92 and the first ring gear R1.

The variator arrangement 90 includes one or more output gears, there being four in the example implementation of FIG. 2, namely gears G5, G11, G12, G7. The gears G5, G11 are coupled (e.g., welded or splined) to co-rotate with the first carrier PC1 via a hollow shaft 134, and the gears G12, G7 are coupled (e.g., welded or splined) to co-rotate with the second ring gear R2 via another hollow shaft 136. The hollow shafts 132, 134, 136 are supported concentrically about the variator shaft 92 to rotate about the variator axis 94 relative to the variator shaft 92.

The variator arrangement 90 interfaces with the drop set arrangement 100 via the gears G5, G11, G12, G7. The drop set arrangement 100 includes additional gears G6, G18, G19, G8 and clutches C2-C5, all being arranged relative to the drop set shaft 102 to rotate about the drop set axis 104. In particular, the gear G6 meshes with gear G5 of the variator arrangement 90 and is coupled (e.g., welded or splined) to co-rotate with the actuatable part of the clutch C2. The fixed part of the clutch C2 is coupled (e.g., welded or splined) to co-rotate with the drop set shaft 102. The gear G18 meshes with gear G11 of the variator arrangement 90 and is coupled (e.g., welded or splined) to co-rotate with the actuatable part of the clutch C4. The fixed part of the clutch C4 is coupled (e.g., welded or splined) to co-rotate with the drop set shaft 102. The gear G19 meshes with gear G12 of the variator arrangement 90 and is coupled (e.g., welded or splined) to co-rotate with the actuatable part of the clutch C5. The fixed part of the clutch C5 is coupled (e.g., welded or splined) to co-rotate with the drop set shaft 102. The gear G8 meshes with gear G7 of the variator arrangement 90 and is coupled (e.g., welded or splined) to co-rotate with the actuatable part of the clutch C3. The fixed part of the clutch C3 is coupled (e.g., welded or splined) to co-rotate with the drop set shaft 102. Hollow shafts may be utilized to couple the gears G6, G18, G19, G8 to the actuatable parts of the respective clutches C2, C4, C5, C3.

The clutches C2, C4, C5, C3 may be considered to be "range" clutches providing different gear ratios for operation of the work vehicle 20 at different prescribed travel speed ranges. As such, the clutch C2 may be considered a first range clutch, the clutch C3 may be considered a second range clutch, the clutch C4 may be considered a third range clutch, and clutch C5 may be considered a fourth range clutch. The first range clutch may thus correspond to a first speed range that is lower than a second speed range associated with the second range clutch and so on. These range clutches C2, C4, C5, C3 may be engaged to transmit power to the drop set shaft 102 and alternatively disengaged to cut off power transmission therethrough. The various forward and reverse operational modes, and the directions and speed ranges therein, discussed below may be implemented with only the four range clutches C2, C4, C5, C3 without the need for additional range clutches or other associated components. That said, the drop set arrangement 100 includes an end gear G20, which, in each of these modes and ranges, transmits power and interfaces with the output arrangement 110 via a single output gear G21 carried by and coupled (e.g., welded or splined) to co-rotate with the output shaft 112 about the output axis 114.

Referring also to FIG. 14, the drop set arrangement 100, in some implementations, such as that depicted in FIG. 2, may include a park brake 140 attached to one end of the drop set shaft 102 to selectively inhibit or prevent rotation of the drop set shaft 102, and in so doing, also inhibit or prevent rotation of the output shaft 112, thereby serving to inhibit or prevent downstream rotation of the rear 30 and/or front 32 axles, and ultimately the wheels of the work vehicle 20. The park brake 140 may include a friction pack 142 of interleaved plates 144 and discs 146. The plates 144 may be fixed against rotation (e.g., to the transmission housing 36), and the discs 146 may be coupled (e.g., welded or splined) to co-rotate with the drop set shaft 102 about the drop set axis 104. Of course, the park brake plates and discs could be mounted in reverse with the discs 146 being fixed and the plates 144 being mounted to the drop set shaft 102.

Figure 12:
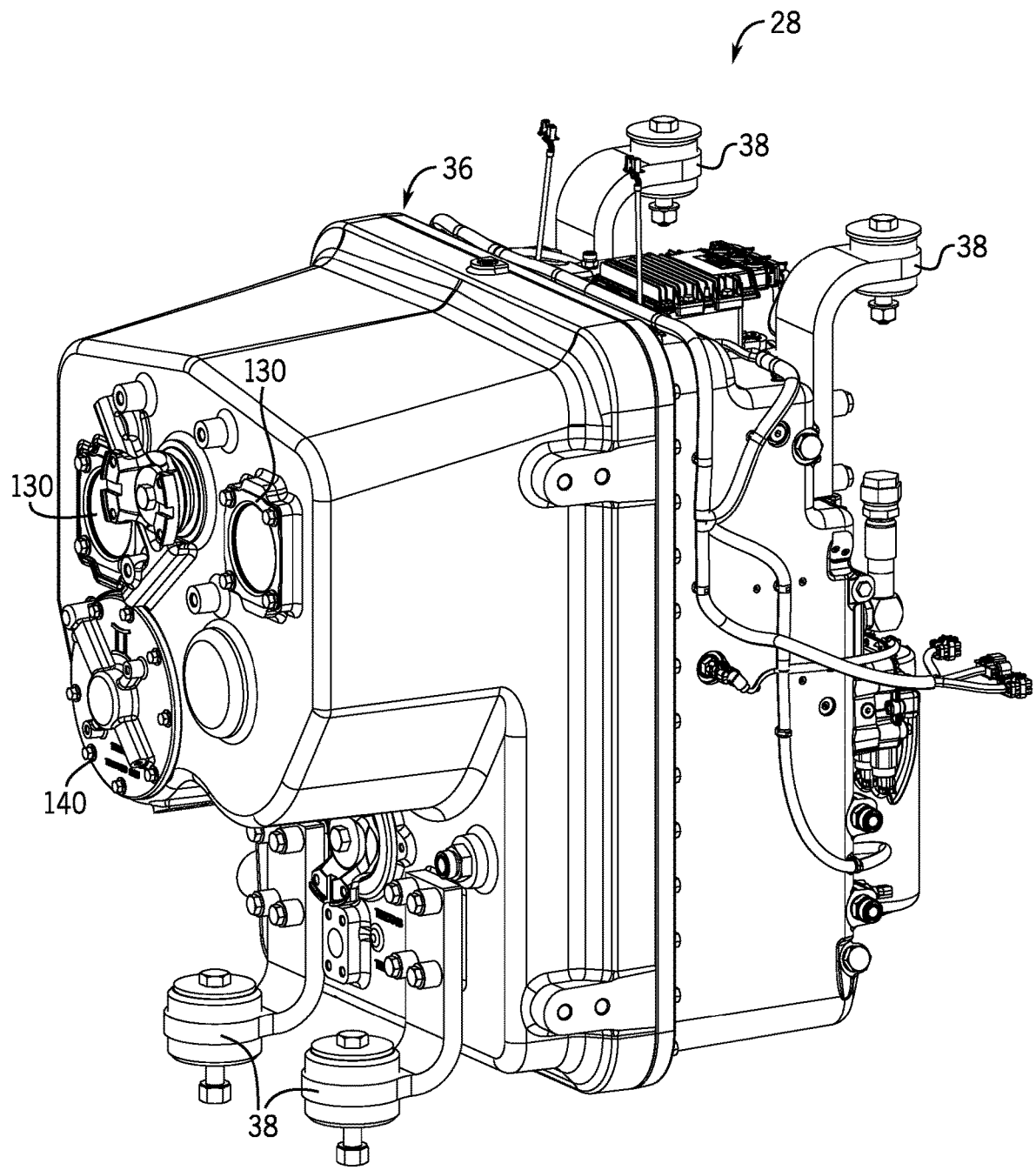
FIGS. 12 and 13 are front and rear perspective views of an example multi-mode CVT.
Figure 13:
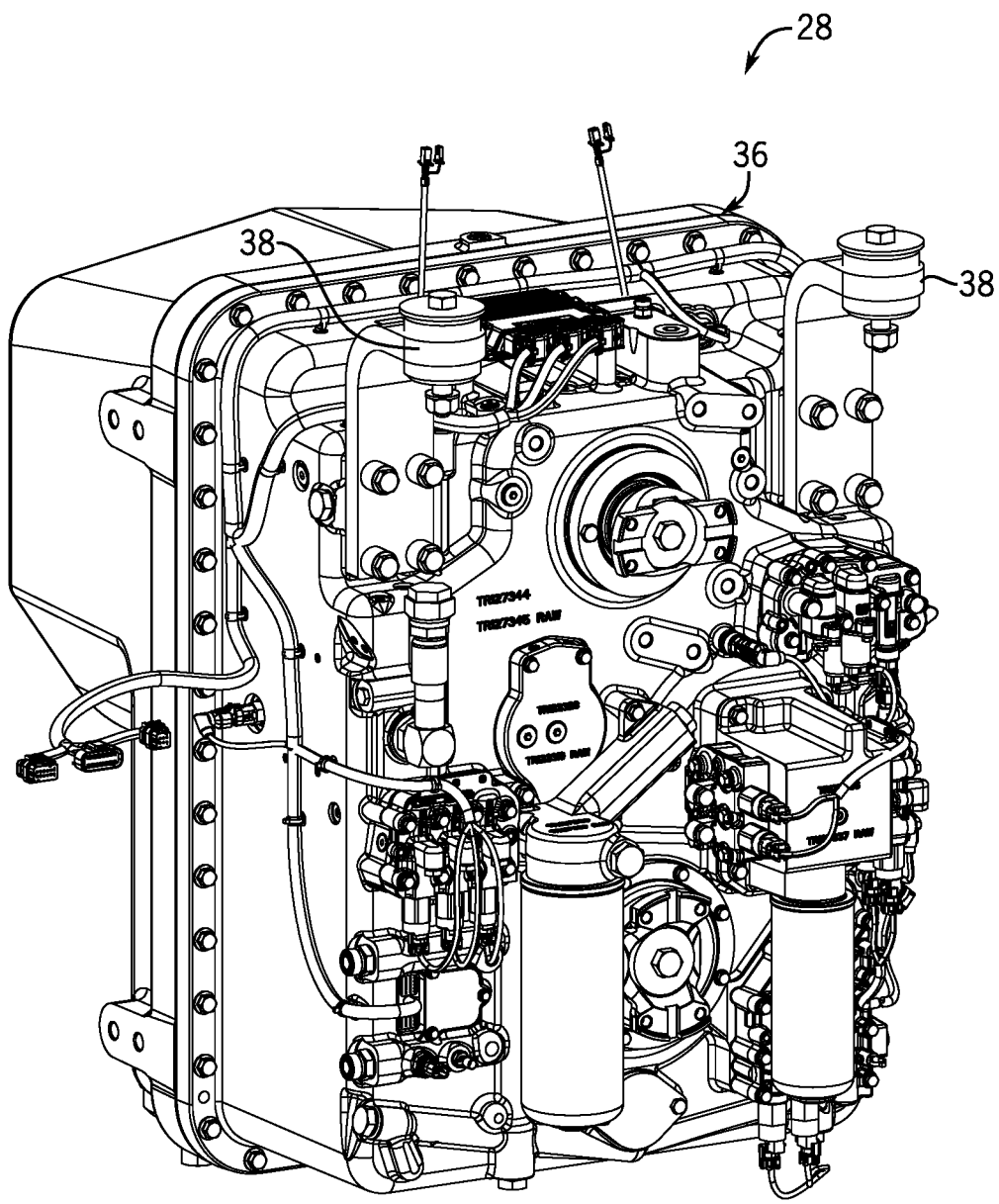

The drop set arrangement 100 thus carries the range clutches C2-C5 and provides a mounting location for the park brake 140 that is at a shaft end, and thus near an outer area of the transmission assembly 40 that may be readily accessed for service, maintenance or replacement without removing the transmission housing 36 (see FIG. 12). Additionally, the drop set arrangement 100 allows for the overall height or vertical distance (i.e., the perpendicular distance between the input shaft 82 and the output shaft 112) to be varied readily in order to meet varied packaging constraints associated with different work vehicle platforms. This can be accomplished by changing the relative spacing between one or more of the respective parallel shafts 92, 102, 112 of the variator arrangement 90, the drop set arrangement 100 and the output arrangement 110. Allowing for spacing variations between three shafts, as opposed to fewer (e.g., two shafts), enhances the dimensional variability of the CVT 28, and thus its flexibility to accommodate the packaging constrains (e.g., the center-to-center perpendicular distance between input and output shafts or axes) of various work vehicle platforms. Moreover, the drop set shaft 102 provides a countershaft to set the appropriate rotational clock direction of the output shaft 112, allowing for a single gear mesh between the drop set arrangement 100 and the output arrangement 110 without the need for one or more intervening idler gears or other rotation direction changing components.

As noted, the CVT 28 may be configured as a multi-mode CVT providing one or more split-path power transmission modes in which power from the engine 24 and the CVP 26 may be summed (e.g., by the variator 96), and the resulting combined power may be delivered to the output shaft 112. In one split-path mode, the output shaft 112 may be rotated within a first speed range, in another split-path mode, the output shaft 112 may be rotated within a second speed range, in another split-path mode, the output shaft 112 may be rotated within a third speed range, and in another split-path mode, the output shaft 112 may be rotated within a fourth speed range. The fourth speed range may be higher than the third speed range, which may be higher than the second speed range, which may be higher than the first speed range. In any case, the CVT 28 may provide one or more lower speed split-path field modes and one or more higher speed split-path field modes. Each of these may be forward modes for rotating the output shaft 112 in a forward direction (i.e., for moving the work vehicle 20 forward) and one or more reverse modes for rotating the output shaft 112 in a reverse (opposite direction) (i.e., for moving the work vehicle 20 in reverse). Additional split-path modes with other speed ranges are contemplated by this disclosure.

Additionally, the CVT 28 may provide one or more CVP-only modes in which mechanical power from the engine 24 is removed from the power flow path to the output shaft 112. The speed range for the output shaft 112 in one or more CVP-only modes may be relatively low, including a "powered zero" CVP-only mode at which torque is maintained at the output shaft 112 while the output shaft 112 remains rotationally stationary (i.e., an angular velocity of zero), and a "creeper" CVP-only mode at which the output shaft 112 is driven at relatively low speed and high torque.

Figure 2A:
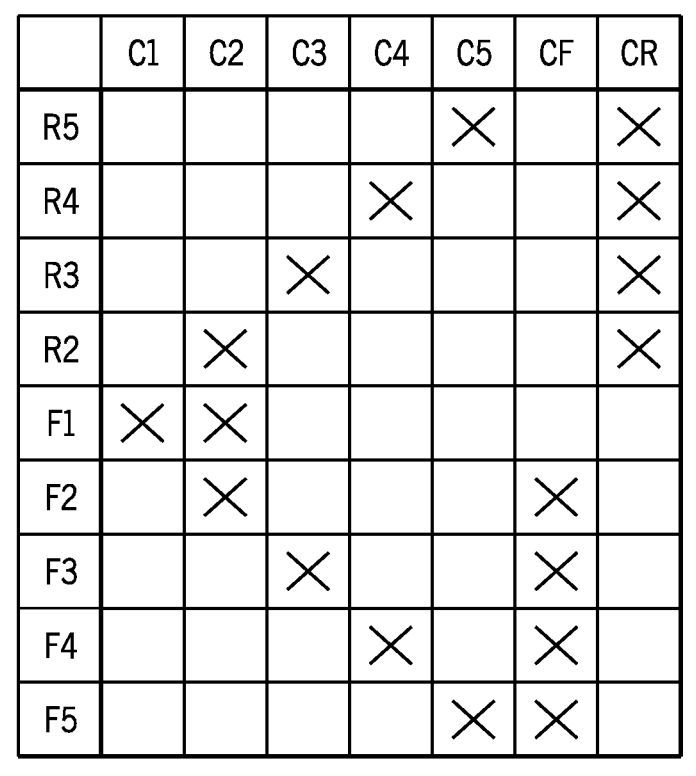

With reference to FIGS. 3-11, several example modes will now be discussed in relation to the implementation of the CVT 28 shown in FIG. 2. FIG. 2A provides a clutch chart indicating the state of engagement of the directional clutches CF, CR, the creeper clutch C1, and the range clutches C2-C5 in each operational mode of the CVT 28. It is noted that the directional clutches CF, CR are alternatively engaged (i.e., not simultaneously engaged in any operational mode) and that, in all but one operational mode (F1/R1) each directional clutch CF, CR is paired with a single range clutch C2-C5. Further, the F1/R1 mode represents the creeper and/or powered zero operational mode and is capable of operating alternatively in both forward and reverse travel directions and without any clutch activation (i.e., engagement or disengagement) when changing directions. Still further, as noted above, in the example implementations described herein, during all operational modes of the CVT 28, the input arrangement 80 powers the pump drive arrangement 70 to provide power to the pumps P1-P3.

Figure 3:
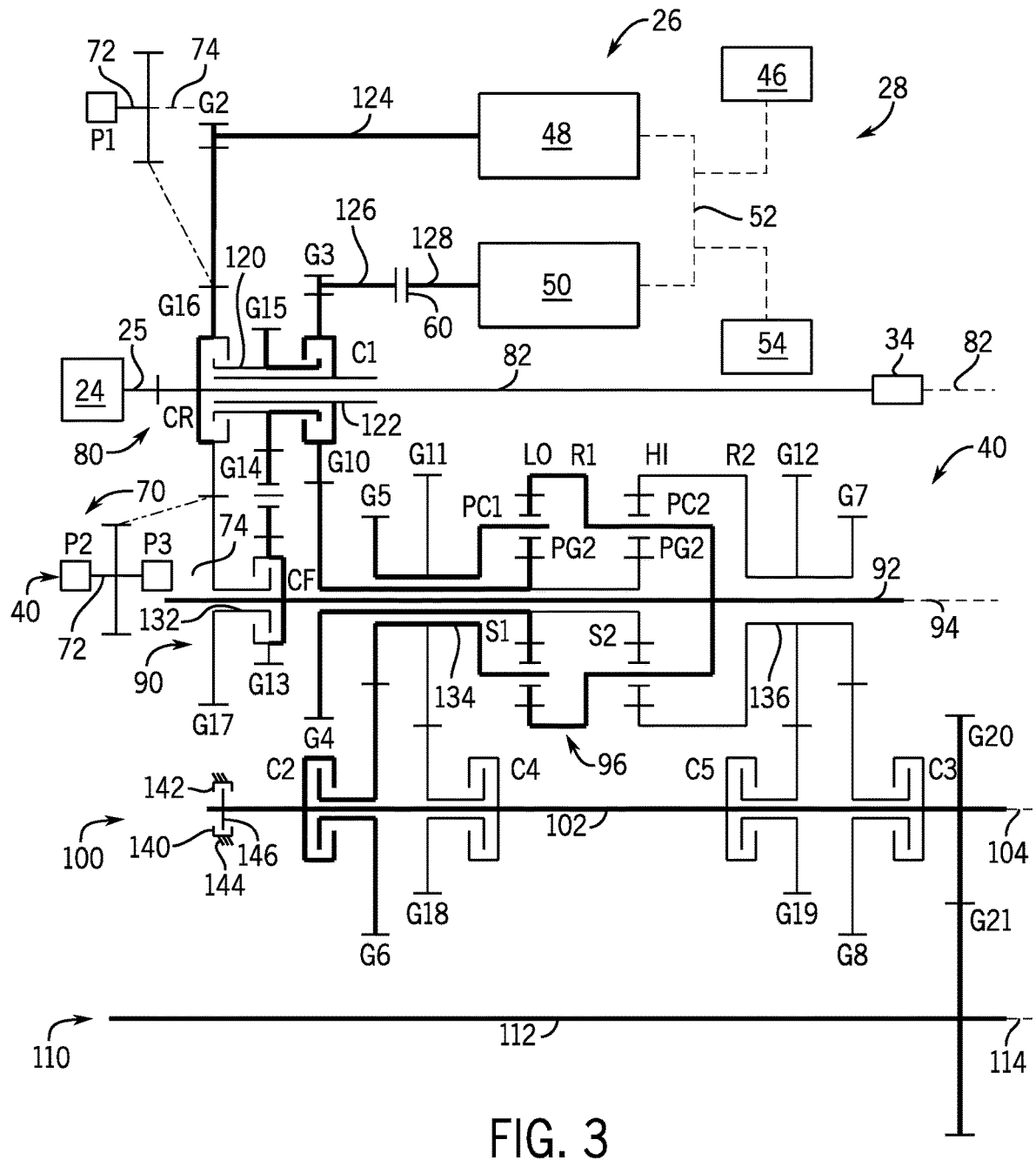
FIGS. 3-11 are schematic views similar to FIG. 2 depicting the power flows in the various modes of operation.

FIG. 3 depicts schematically the CVT 28 in the F1/R1 mode of operation with tractive power flow shown in bold lines. As noted above, the F1/R1 mode is a CVP-only creeper and/or powered zero mode, which in the example implementation is considered a series electric mode. As shown and indicated in the clutch chart of FIG. 2A, only creeper clutch C1 and range clutch C2 are engaged in the F1/R1 mode. Both directional clutches CF, CR and range clutches C3-C5 are disengaged. Rotational mechanical power from the engine 24 is transmitted through the engine shaft 25 to the input shaft 80 and through the fixed part of the disengaged reverse clutch CR to the gear G2, and then to the first CVM 48 via the first CVM shaft 124. The first CVM 48 converts rotational mechanical power to electrical power which may be stored or delivered to the second CVM 50 via the conduit 52. The second CVM 50 drives the second CVM shaft (shafts 126, 128 and the damper mechanism 60) to transmit CVP power through the gear G3, the fixed part of the clutch C1. Here the power flow branches so that a portion of the CVP power flows internally through the engaged clutch C1 to the outer hollow shaft 120, the gear G15, the idler gear G14, the gear G13, and the fixed part of the disengaged clutch CF to the variator shaft 92. Another portion of the CVP power flows from the clutch C1 to the gear G10 to the gear G4 and the first sun gear S1. These individual power flows are recombined or summed in the variator 96 in an S1, PC2 input and PC1 output power flow configuration. Specifically, the portion of the CVP power passing through the variator shaft 92 from the disengaged forward clutch CF is input to the variator 96 through the second planet carrier PC2 and transmitted to the first ring gear R1 and the first planet gears PG1. The other portion of the CVP power is input to the variator 96 through the first sun gear S1 and then transmitted to the first planet gears PG1. The recombined CVP power is output from the variator 96 through the first planet carrier PC1 to drive the gear G5 via the hollow shaft 134. The gear G5 meshes with the gear G6, which drives the engaged range clutch C2 to in turn drive the drop set shaft 102 and the gear G20. Gear G20 meshes with gear G21 of the output arrangement 110 to drive the output shaft 112 to deliver the output power from the CVT 28. In this way, high torque, low- or zero-speed power is transmitted through the CVT 28 solely from the CVP 26 to the output shaft 112. Rotational mechanical power from the engine 24 is decoupled from the output shaft 112 with the engine 24 only serving to power the first CVM 48 to generate electrical power. Further, by controlling the second CVM 50 to operate in reverse (i.e., rotate the rotor in the opposite clock direction), the rotational clock direction of the power flow powers through the CVT 28, and ultimately of the output shaft 112, may be reversed to go to and from forward and reverse travel directions with the need for a shift event (i.e., engaging or disengaging the clutches C1, C2 or any other clutches).

Figure 4:
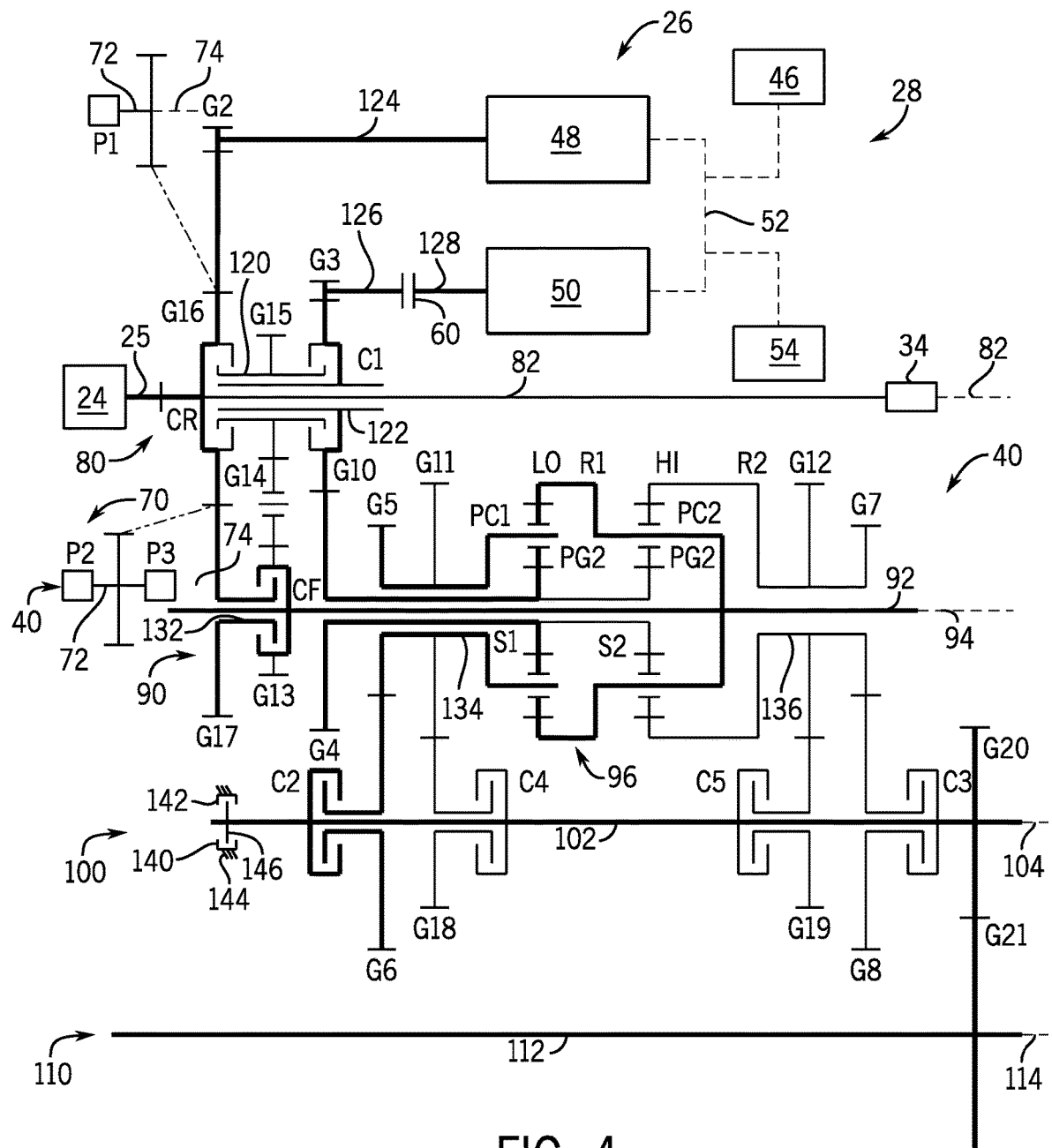

FIG. 4 depicts schematically the CVT 28 in an F2 mode of operation with tractive power flow shown in bold lines. The F2 mode is a forward travel direction split-path mode in which the rotational mechanical power from the engine 24 is combined with the CVP power from the second CVM 50 to provide tractive power to drive the work vehicle 20 in a forward travel direction. As shown and indicated in the clutch chart of FIG. 2A, only the forward clutch CF and the range clutch C2 are engaged in the F2 mode. The reverse clutch CR and creeper clutch C1 and the range clutches C3-C5 are disengaged. Rotational mechanical power from the engine is transmitted through the engine shaft 25 to the input shaft 80 and through the fixed part of the disengaged reverse clutch CR to the gear G2, and then to the first CVM 48 via the first CVM shaft 124. The first CVM 48 converts rotational mechanical power to electrical power which may be stored or delivered to the second CVM 50 via the conduit 52. The second CVM 50 drives the second CVM shaft (shafts 126, 128 and the damper mechanism 60) to transmit CVP power through the gear G3, the fixed part of the disengaged clutch C1. The engine power is transmitted to the variator 96 via the gear G16, gear G17, hollow shaft 132, and internally through the engaged forward clutch CF to the variator shaft 92. The CVP power is transmitted to the variator 96 via the gear G10, gear G4, and the first sun gear S1. These individual power flows are combined or summed in the variator 96 in an S1, PC2 input and PC1 output power flow configuration. Specifically, the engine power passing through the variator shaft 92 from the engaged forward clutch CF is input to the variator 96 through the second planet carrier PC2 and transmitted to the first ring gear R1 and the first planet gears PG1. The CVP power is input to the variator 96 through the first sun gear S1 and then transmitted to the first planet gears PG1. The combined power is output from the variator 96 through the first planet carrier PC1 to drive the gear G5 via the hollow shaft 134. The gear G5 meshes with the gear G6, which drives the engaged range clutch C2 to in turn drive the drop set shaft 102 and the gear G20. Gear G20 meshes with gear G21 of the output arrangement 110 to drive the output shaft 112 to deliver the output power from the CVT 28. In this mode, the combined power is output at a speed and torque to drive the work vehicle 20 within a first range.

Figure 5:
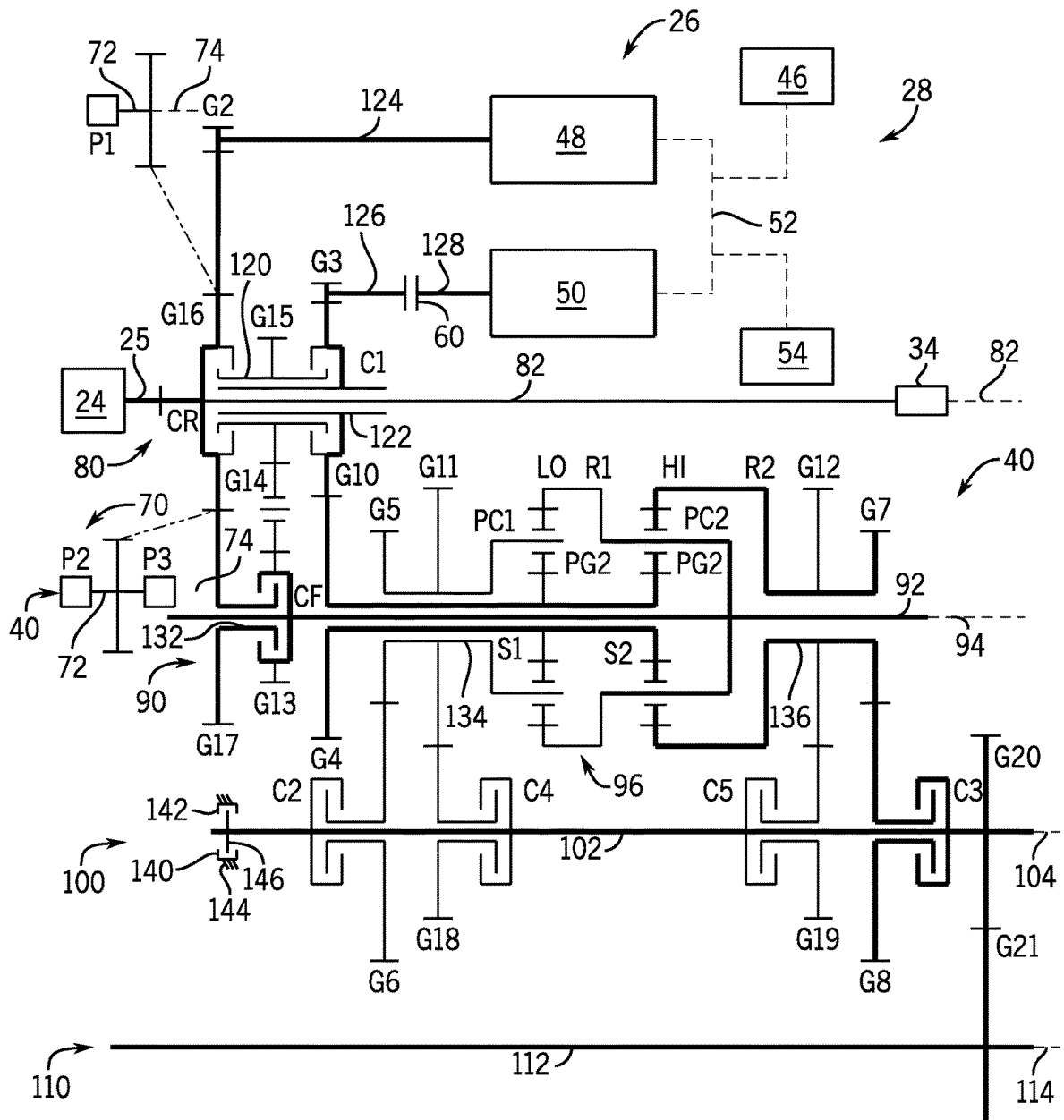

FIG. 5 depicts schematically the CVT 28 in an F3 mode of operation with tractive power flow shown in bold lines. The F3 mode is a forward travel direction split-path mode in which the rotational mechanical power from the engine 24 is combined with the CVP power from the second CVM 50 to provide tractive power to drive the work vehicle 20 in the forward travel direction. As shown and indicated in the clutch chart of FIG. 2A, only the forward clutch CF and the range clutch C3 are engaged in the F3 mode. The reverse clutch CR, the creeper clutch C1 and the range clutches C2, C4, C5 are disengaged. Rotational mechanical power from the engine 24 is transmitted through the engine shaft 25 to the input shaft 80 and through the fixed part of the disengaged reverse clutch CR to the gear G2, and then to the first CVM 48 via the first CVM shaft 124. The first CVM 48 converts rotational mechanical power to electrical power which may be stored or delivered to the second CVM 50 via the conduit 52. The second CVM 50 drives the second CVM shaft (shafts 126, 128 and the damper mechanism 60) to transmit CVP power through the gear G3, the fixed part of the disengaged clutch C1. The engine power is transmitted to the variator 96 via the gear G16, gear G17, hollow shaft 132, and internally through the engaged forward clutch CF to the variator shaft 92. The CVP power is transmitted to the variator 96 via the gear G10, gear G4, and a second sun shaft S2. These individual power flows are combined or summed in the variator 96 in an S2, PC2 input and R2 output power flow configuration. Specifically, the engine power passing through the variator shaft 92 from the engaged forward clutch CF is input to the variator 96 through the second planet carrier PC2 and transmitted to the second planet gears PG2. The CVP power is input to the variator 96 through the second sun shaft S2 and then transmitted to the second planet gears PG2. The combined power is output from the variator 96 through the second ring gear R2 to drive the gear G7 via the hollow shaft 136. The gear G7 meshes with the gear G8, which drives the engaged range clutch C3 to in turn drive the drop set shaft 102 and the gear G20. Gear G20 meshes with gear G21 of the output arrangement 110 to drive the output shaft 112 to deliver the output power from the CVT 28. In this mode, the combined power is output at a speed and torque to drive the work vehicle 20 within a second range that is higher than the first range of the F2 operational mode.

Figure 6:
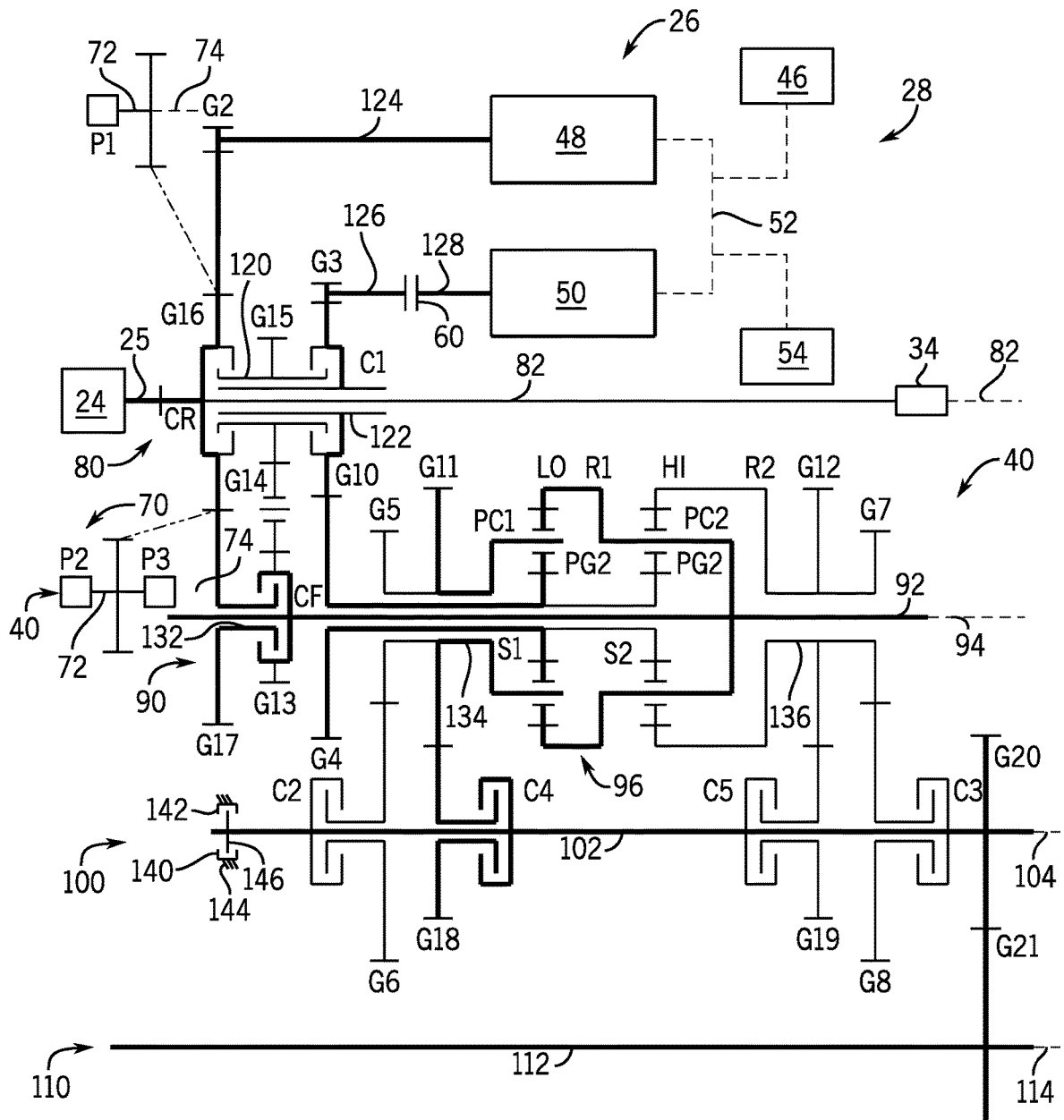

FIG. 6 depicts schematically the CVT 28 in an F4 mode of operation with tractive power flow shown in bold lines. The F4 mode is a forward travel direction split-path mode in which the rotational mechanical power from the engine 24 is combined with the CVP power from the second CVM 50 to provide tractive power to drive the work vehicle 20 in the forward travel direction. As shown and indicated in the clutch chart of FIG. 2A, only the forward clutch CF and the range clutch C4 are engaged in the F4 mode. The reverse clutch CR, the creeper clutch C1 and the range clutches C2, C3, C5 are disengaged. Rotational mechanical power from the engine 24 is transmitted through the engine shaft 25 to the input shaft 80 and through the fixed part of the disengaged reverse clutch CR to the gear G2, and then to the first CVM 48 via the first CVM shaft 124. The first CVM 48 converts rotational mechanical power to electrical power which may be stored or delivered to the second CVM 50 via the conduit 52. The second CVM 50 drives the second CVM shaft (shafts 126, 128 and the damper mechanism 60) to transmit CVP power through the gear G3, the fixed part of the disengaged clutch C1. The engine power is transmitted to the variator 96 via the gear G16, gear G17, hollow shaft 132, and internally through the engaged forward clutch CF to the variator shaft 92. The CVP power is transmitted to the variator 96 via the gear G10, gear G4, and the first sun gear S1. These individual power flows are combined or summed in the variator 96 in an S1, PC2 input and PC1 output power flow configuration. Specifically, the engine power passing through the variator shaft 92 from the engaged forward clutch CF is input to the variator 96 through the second planet carrier PC2 and transmitted to the first ring gear R1 and the first planet gears PG1. The CVP power is input to the variator 96 through the first sun gear S1 and then transmitted to the first planet gears PG1. The combined power is output from the variator 96 through the first planet carrier PC1 to drive the gear G11 via the hollow shaft 134. The gear G11 meshes with the gear G18, which drives the engaged range clutch C4 to in turn drive the drop set shaft 102 and the gear G20. Gear G20 meshes with gear G21 of the output arrangement 110 to drive the output shaft 112 to deliver the output power from the CVT 28. In this mode, the combined power is output at a speed and torque to drive the work vehicle 20 within a third range that is higher than the second range of the F3 operational mode.

Figure 7:
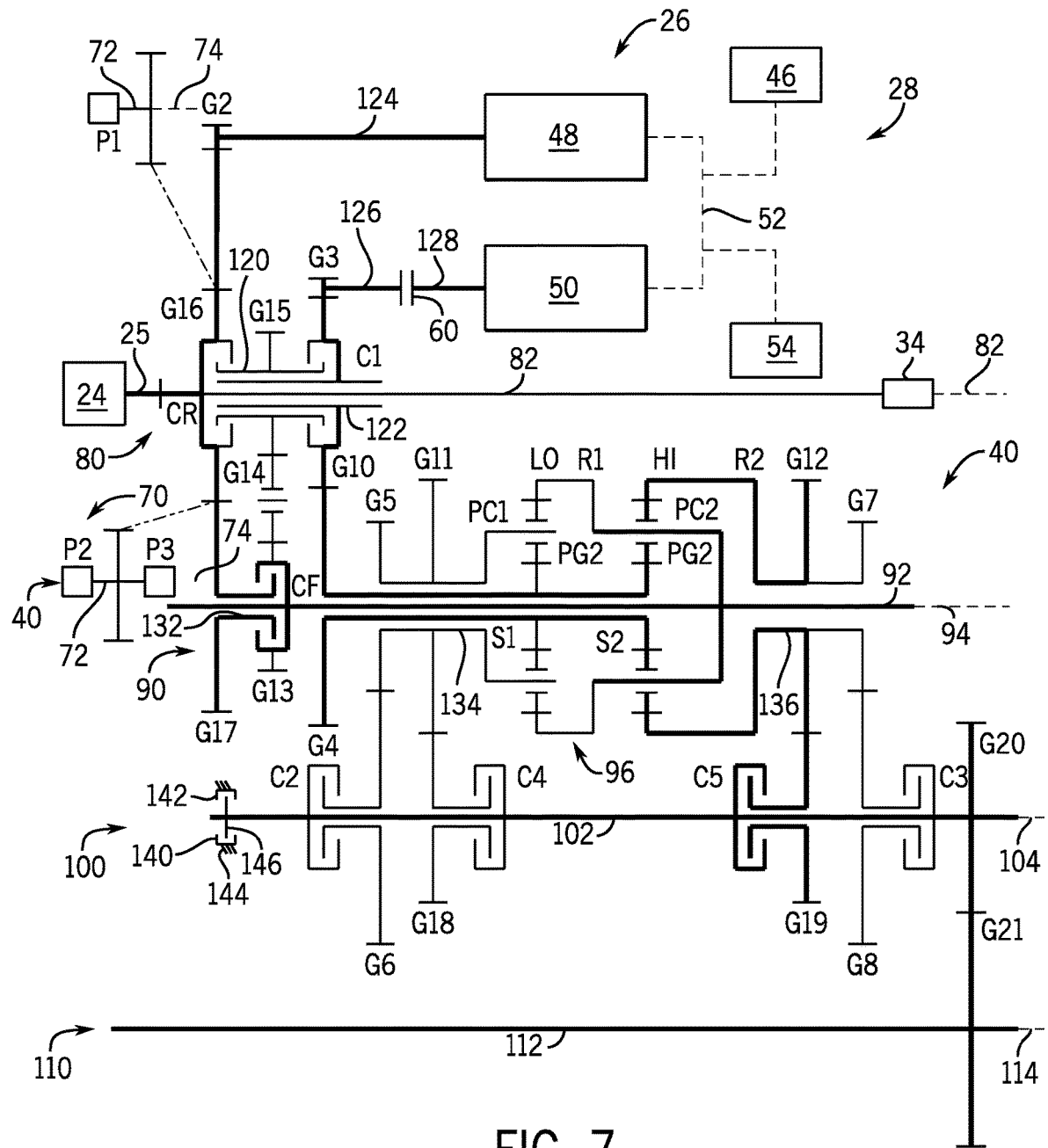

FIG. 7 depicts schematically the CVT 28 in an F5 mode of operation with tractive power flow shown in bold lines. The F5 mode is a forward travel direction split-path mode in which the rotational mechanical power from the engine 24 is combined with the CVP power from the second CVM 50 to provide tractive power to drive the work vehicle 20 in the forward travel direction. As shown and indicated in the clutch chart of FIG. 2A, only the forward clutch CF and the range clutch C5 are engaged in the F5 mode. The reverse clutch CR, the creeper clutch C1 and the range clutches C2-C4 are disengaged. Rotational mechanical power from the engine 24 is transmitted through the engine shaft 25 to the input shaft 80 and through the fixed part of the disengaged reverse clutch CR to the gear G2, and then to the first CVM 48 via the first CVM shaft 124. The first CVM 48 converts rotational mechanical power to electrical power which may be stored or delivered to the second CVM 50 via the conduit 52. The second CVM 50 drives the second CVM shaft (shafts 126, 128 and the damper mechanism 60) to transmit CVP power through the gear G3, the fixed part of the disengaged clutch C1. The engine power is transmitted to the variator 96 via the gear G16, gear G17, hollow shaft 132, and internally through the engaged forward clutch CF to the variator shaft 92. The CVP power is transmitted to the variator 96 via the gear G10, gear G4, and the second sun shaft S2. These individual power flows are combined or summed in the variator 96 in an S2, PC2 input and R2 output power flow configuration. Specifically, the engine power passing through the variator shaft 92 from the engaged forward clutch CF is input to the variator 96 through the second planet carrier PC2 and transmitted to the second planet gear PG2. The CVP power is input to the variator 96 through the second sun shaft S2 and then transmitted to the second planet gears PG2. The combined power is output from the variator 96 through the second ring R2 to drive the gear G12 via the hollow shaft 136. The gear G12 meshes with the gear G19, which drives the engaged range clutch C5 to in turn drive the drop set shaft 102 and the gear G20. Gear G20 meshes with gear G21 of the output arrangement 110 to drive the output shaft 112 to deliver the output power from the CVT 28. In this mode, the combined power is output at a speed and torque to drive the work vehicle 20 within a fourth range that is higher than the third range of the F4 operational mode.

In the foregoing operational modes F2-F5, the CVT 28 provides a plurality of split-path power forward travel direction modes of operation for the work vehicle 20 in which output power is at different gear ratios suited for field operation of the work vehicle 20 at different speed ranges. The CVT 28 may also provide a plurality of reverse travel direction modes, which may be in a corresponding number of split-path power modes as in the forward travel direction. The CVT 28 may provide for reverse creeper operation in the R1/F1 mode described above.

Figure 8:
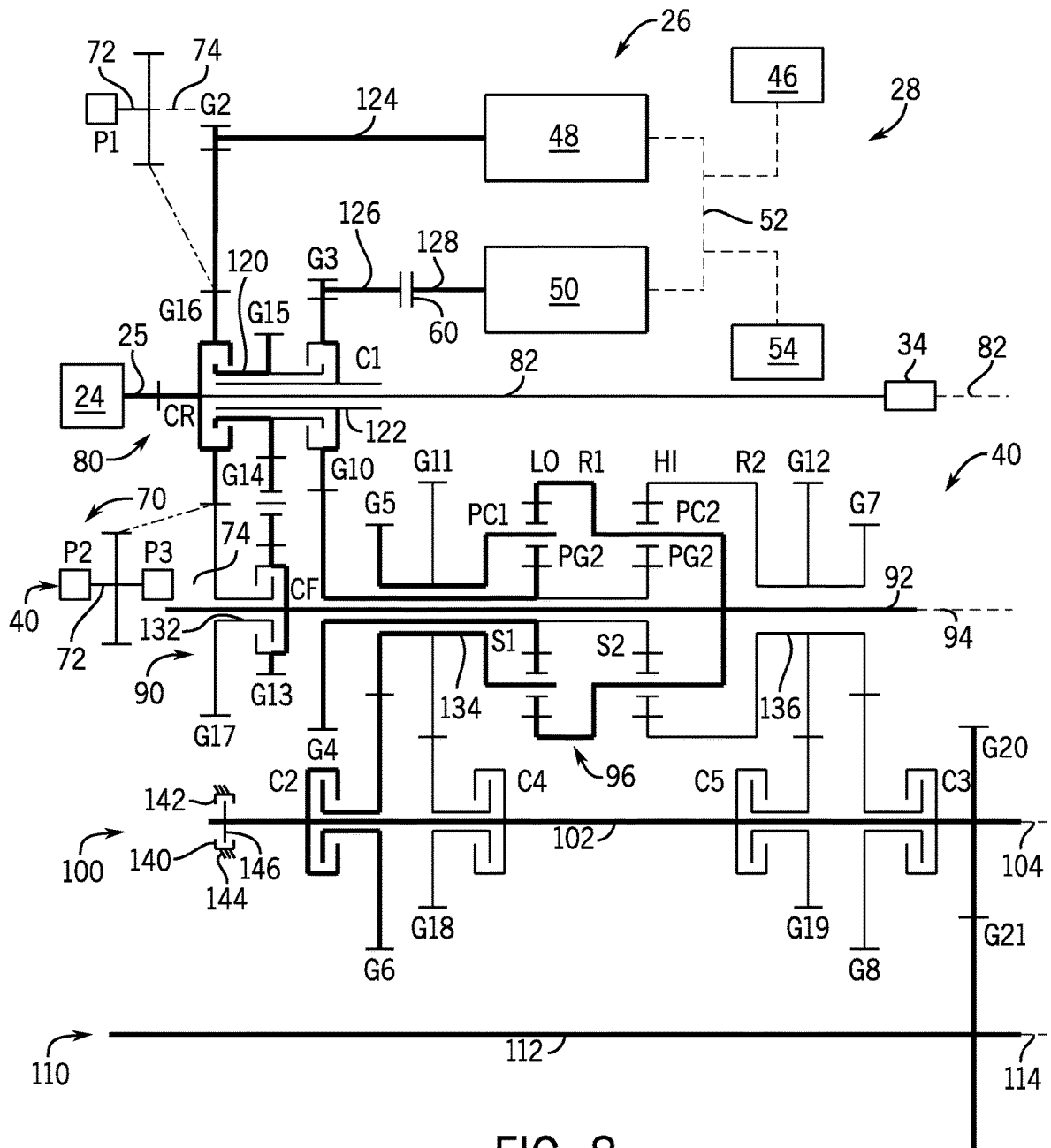

FIG. 8 depicts schematically the CVT 28 in an R2 mode of operation with tractive power flow shown in bold lines. The R2 mode is a reverse travel direction split-path mode in which the rotational mechanical power from the engine 24 is combined with the CVP power from the second CVM 50 to provide tractive power to drive the work vehicle 20 in the reverse travel direction. As shown and indicated in the clutch chart of FIG. 2A, only the reverse clutch CR and the range clutch C2 are engaged in the R2 mode. The forward clutch CF, the creeper clutch C1, and the range clutches C3-C5 are disengaged. Rotational mechanical power from the engine 24 is transmitted through the engine shaft 25 to the input shaft 80 and through the fixed part of the engaged reverse clutch CR to the gear G2, and then to the first CVM 48 via the first CVM shaft 124. The first CVM 48 converts rotational mechanical power to electrical power which may be stored or delivered to the second CVM 50 via the conduit 52. The second CVM 50 drives the second CVM shaft (shafts 126, 128 and the damper mechanism 60) to transmit CVP power through the gear G3, the fixed part of the disengaged clutch C1. The engine power is transmitted to the variator 96 internally through the engaged reverse clutch CR, the outer hollow shaft 120, gear G15, idler gear G4, gear G13, and the outer fixed part of the forward clutch CF to the variator shaft 92. The CVP power is transmitted to the variator 96 via the gear G10, gear G4, and the first sun gear S1. These individual power flows are combined or summed in the variator 96 in an S1, PC2 input and PC1 output power flow configuration. Specifically, the engine power is input to the variator 96 through the second planet carrier PC2 and transmitted to the first ring gear R1 and the first planet gears PG1. The CVP power is input to the variator 96 through the first sun gear S1 and then transmitted to the first planet gears PG1. The combined power is output from the variator 96 through the first planet carrier PC1 to drive the gear G5 via the hollow shaft 134. The gear G5 meshes with the gear G6, which drives the engaged range clutch C2 to in turn drive the drop set shaft 102 and the gear G20. Gear G20 meshes with gear G21 of the output arrangement 110 to drive the output shaft 112 to deliver the output power from the CVT 28. In this mode, the combined power is output at a speed and torque to drive the work vehicle 20 in the reverse direction within the first range.

Figure 9:
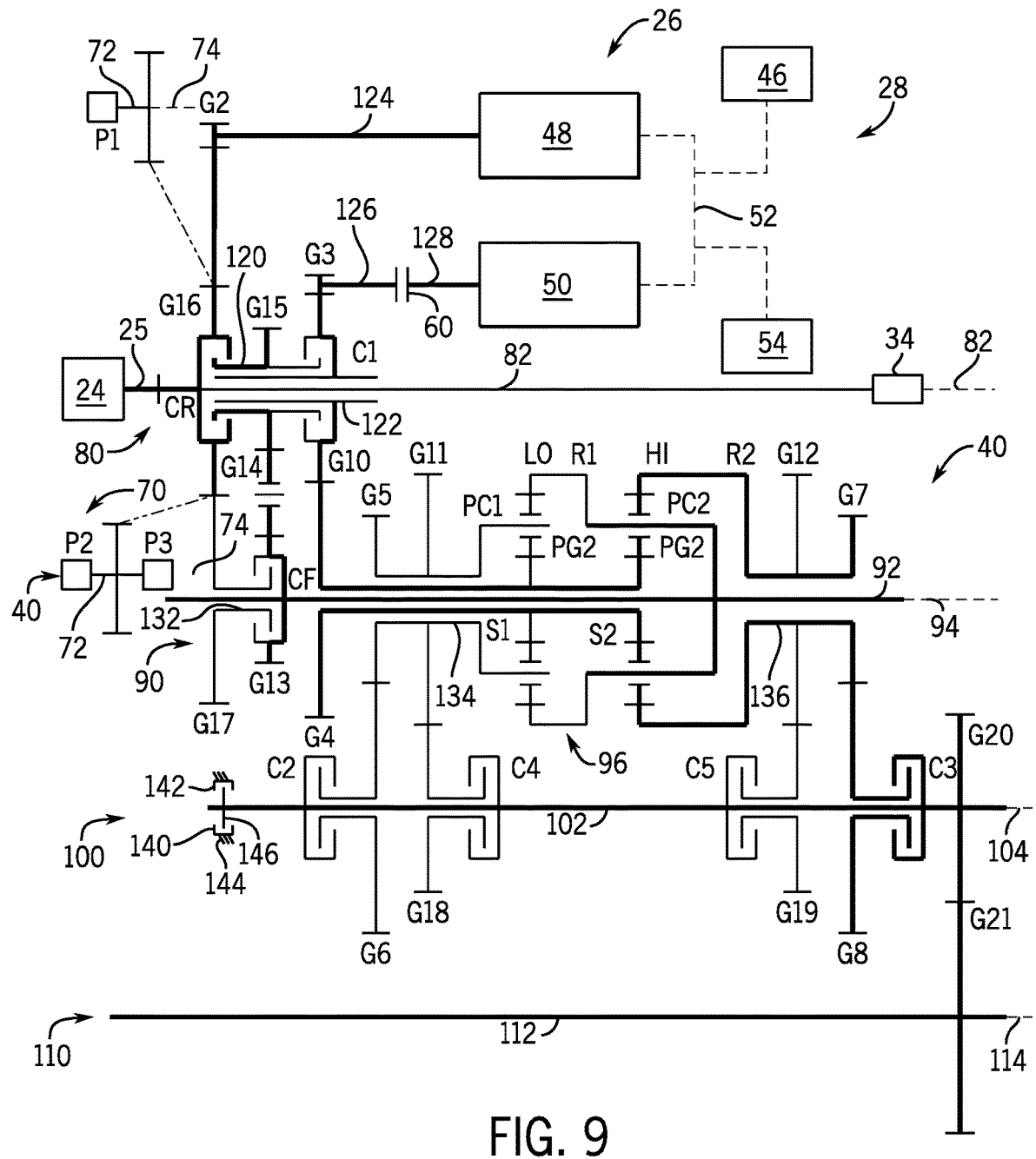

FIG. 9 depicts schematically the CVT 28 in an R3 mode of operation with tractive power flow shown in bold lines. The R3 mode is a reverse travel direction split-path mode in which the rotational mechanical power from the engine 24 is combined with the CVP power from the second CVM 50 to provide tractive power to drive the work vehicle 20 in the reverse travel direction. As shown and indicated in the clutch chart of FIG. 2A, only the reverse clutch CR and the range clutch C3 are engaged in the R3 mode. The forward clutch CF, the creeper clutch C1, and the range clutches C2, C4, C5 are disengaged. Rotational mechanical power from the engine 24 is transmitted through the engine shaft 25 to the input shaft 80 and through the fixed part of the engaged reverse clutch CR to the gear G2, and then to the first CVM 48 via the first CVM shaft 124. The first CVM 48 converts rotational mechanical power to electrical power which may be stored or delivered to the second CVM 50 via the conduit 52. The second CVM 50 drives the second CVM shaft (shafts 126, 128 and the damper mechanism 60) to transmit CVP power through the gear G3, the fixed part of the disengaged clutch C1. The engine power is transmitted to the variator 96 internally through the engaged reverse clutch CR, the outer hollow shaft 120, gear G15, idler gear G4, gear G13, and the outer fixed part of the forward clutch CF to the variator shaft 92. The CVP power is transmitted to the variator 96 via the gear G10, gear G4, and the second sun shaft S2. These individual power flows are combined or summed in the variator 96 in an S2, PC2 input and R2 output power flow configuration. Specifically, the engine power passing through the variator shaft is input to the variator 96 through the second planet carrier PC2 and transmitted to the second planet gears PG2. The CVP power is input to the variator 96 through the second sun shaft S2 and then transmitted to the second planet gears PG2. The combined power is output from the variator 96 through the second ring gear R2 to drive the gear G7 via the hollow shaft 136. The gear G7 meshes with the gear G8, which drives the engaged range clutch C3 to in turn drive the drop set shaft 102 and the gear G20. Gear G20 meshes with gear G21 of the output arrangement 110 to drive the output shaft 112 to deliver the output power from the CVT 28. In this mode, the combined power is output at a speed and torque to drive the work vehicle 20 in the reverse direction within the second range.

Figure 10:
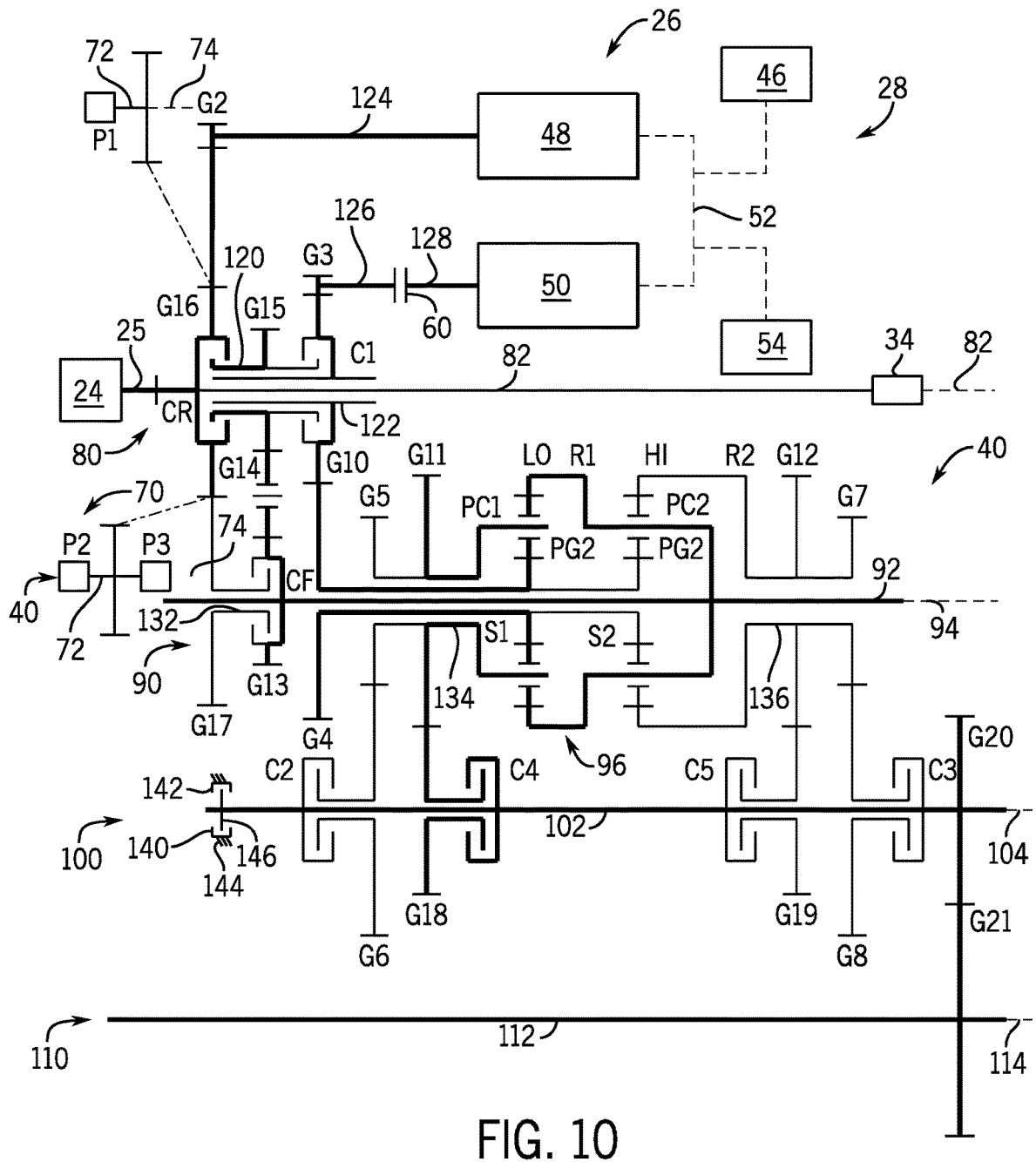

FIG. 10 depicts schematically the CVT 28 in an R4 mode of operation with tractive power flow shown in bold lines. The R4 mode is a reverse travel direction split-path mode in which the rotational mechanical power from the engine 24 is combined with the CVP power from the second CVM 50 to provide tractive power to drive the work vehicle 20 in the reverse travel direction. As shown and indicated in the clutch chart of FIG. 2A, only the reverse clutch CR and the range clutch C4 are engaged in the R4 mode. The forward clutch CF, the creeper clutch C1, and the range clutches C2, C3, C5 are disengaged. Rotational mechanical power from the engine 24 is transmitted through the engine shaft 25 to the input shaft 80 and through the fixed part of the engaged reverse clutch CR to the gear G2, and then to the first CVM 48 via the first CVM shaft 124. The first CVM 48 converts rotational mechanical power to electrical power which may be stored or delivered to the second CVM 50 via the conduit 52. The second CVM 50 drives the second CVM shaft (shafts 126, 128 and the damper mechanism 60) to transmit CVP power through the gear G3, the fixed part of the disengaged clutch C1. The engine power is transmitted to the variator 96 internally through the engaged reverse clutch CR, the outer hollow shaft 120, gear G15, idler gear G4, gear G13, and the outer fixed part of the forward clutch CF to the variator shaft 92. The CVP power is transmitted to the variator 96 via the gear G10, gear G4, and the first sun gear S1. These individual power flows are combined or summed in the variator 96 in an S1, PC2 input and PC1 output power flow configuration. Specifically, the engine power passing through the variator shaft is input to the variator 96 through the second planet carrier PC2 and transmitted to the second planet gears PG2. The CVP power is input to the variator 96 through the first sun gear S1 and then transmitted to the first planet gears PG1. The combined power is output from the variator 96 through the first planet carrier PC1 to drive the gear G11 via the hollow shaft 134. The gear G11 meshes with the gear G18, which drives the engaged range clutch C4 to in turn drive the drop set shaft 102 and the gear G20. Gear G20 meshes with gear G21 of the output arrangement 110 to drive the output shaft 112 to deliver the output power from the CVT 28. In this mode, the combined power is output at a speed and torque to drive the work vehicle 20 in the reverse travel direction within the third range.

Figure 11:
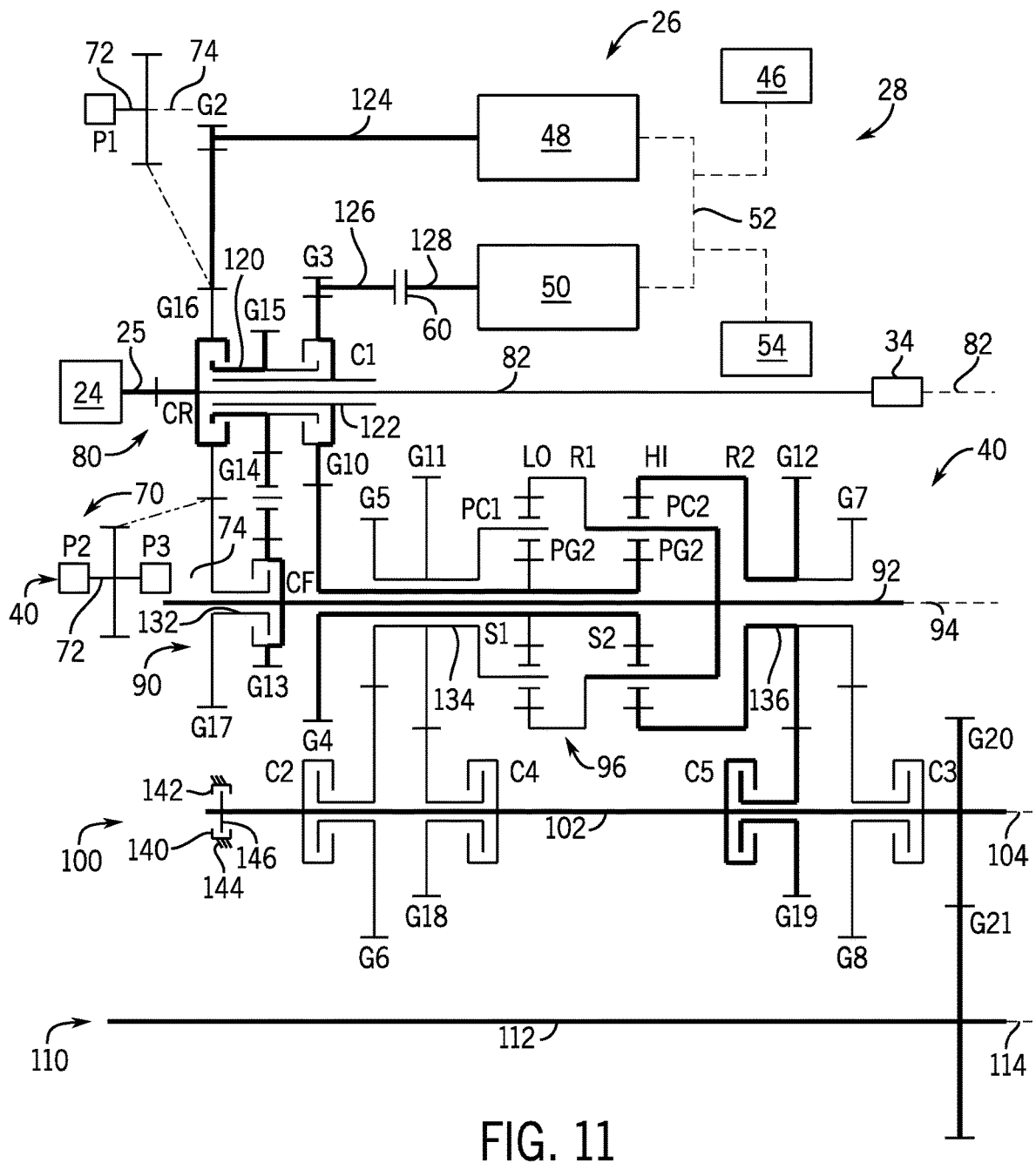

FIG. 11 depicts schematically the CVT 28 in an R5 mode of operation with tractive power flow shown in bold lines. The R5 mode is a reverse travel direction split-path mode in which the rotational mechanical power from the engine 24 is combined with the CVP power from the second CVM 50 to provide tractive power to drive the work vehicle 20 in the reverse travel direction. As shown and indicated in the clutch chart of FIG. 2A, only the reverse clutch CR and the range clutch C5 are engaged in the R5 mode. The forward clutch CF, the creeper clutch C1, and the range clutches C2-C4 are disengaged. Rotational mechanical power from the engine 24 is transmitted through the engine shaft 25 to the input shaft 80 and through the fixed part of the engaged reverse clutch CR to the gear G2, and then to the first CVM 48 via the first CVM shaft 124. The first CVM 48 converts rotational mechanical power to electrical power which may be stored or delivered to the second CVM 50 via the conduit 52. The second CVM 50 drives the second CVM shaft (shafts 126, 128 and the damper mechanism 60) to transmit CVP power through the gear G3, the fixed part of the disengaged clutch C1. The engine power is transmitted to the variator 96 internally through the engaged reverse clutch CR, the outer hollow shaft 120, gear G15, idler gear G4, gear G13, and the outer fixed part of the forward clutch CF to the variator shaft 92. The CVP power is transmitted to the variator 96 via the gear G10, gear G4, and the second sun shaft S2. These individual power flows are combined or summed in the variator 96 in an S2, PC2 input and R2 output power flow configuration. Specifically, the engine power passing through the variator shaft is input to the variator 96 through the second planet carrier PC2 and transmitted to the second planet gears PG2. The CVP power is input to the variator 96 through the second sun shaft S2 and then transmitted to the second planet gears PG2. The combined power is output from the variator 96 through the second ring R2 to drive the gear G12 via the hollow shaft 136. The gear G12 meshes with the gear G19, which drives the engaged range clutch C5 to in turn drive the drop set shaft 102 and the gear G20. Gear G20 meshes with gear G21 of the output arrangement 110 to drive the output shaft 112 to deliver the output power from the CVT 28. In this mode, the combined power is output at a speed and torque to drive the work vehicle 20 in the reverse travel direction within the fourth range.

CONCLUSION

Accordingly, the various example implementations and modalities detailed above describe a multi-mode, CVP integrated CVT readily able to be utilized across various work vehicle platforms. The CVT is configured to be compact and facilitate flexibility in the gear ratios and the location of the output shaft, while adhering to stringent packaging constraints, such as the mounting location within the engine or transmission compartment of the vehicle and the locations at which the CVT interfaces with the engine shaft and PTO. The CVT is configured with four primary shafts and a low quantity of clutches that enable various modes with different speeds and torques. The CVT includes a drop set as the third (or elevationally second lowest shaft) on which the range clutches and associated gears may be carried that cooperate with other gears of the assembly to provide the various gear ratios needed for the specific or common operational requirements of various work vehicle platforms. The gears and the spacing of the drop set shaft from the other shafts may be selected to meet the desired packaging constraints, thus readily meeting a prescribed distance, or fall within a range of allowable distances, between an input axis and an output axis. The operator may select between these different modes and/or the CVT may automatically shift between these modes to maintain high operating efficiency in a number of different operating conditions.

As will be appreciated by one skilled in the art, certain aspects of the disclosed subject matter may be embodied as a method, system (e.g., a work vehicle control or power system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely exemplary embodiments of the present disclosure.

For the sake of brevity, conventional techniques related to work vehicle and engine operation, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A multi-mode continuously variable transmission (CVT) for a work vehicle powertrain having an engine rotating an engine shaft to deliver engine power to the CVT, the CVT comprising:
a continuously variable power source (CVP) generating CVP power;
an input arrangement having an input shaft couplable to the engine shaft to receive the engine power and rotate about an input axis, the input shaft supporting one or more clutch components about the input axis;

a variator arrangement having a variator shaft rotating about a variator axis and supporting a planetary set and one or more clutch components about the variator axis;

a drop set arrangement having a drop set shaft rotating about a drop set axis and supporting one or more clutch components about the drop set axis; and an output arrangement having an output shaft rotating about an output axis and supporting one or more output components about the output shaft;

wherein the input arrangement, the variator arrangement and the drop set arrangement provide a selective gear reduction for transmission of an output power according to a plurality of transmission modes in which:

(a) in a CVP-only mode:
a clutch of the input arrangement transmits the CVP power to the planetary set of the variator arrangement;
a clutch of the variator arrangement decouples the engine power from the planetary set of the variator arrangement;
a clutch of the drop set arrangement transmits the CVP power to the output arrangement; and
the output arrangement outputs the CVP power as the output power; and (b) in a split-path mode:
a clutch of the input arrangement transmits the CVP power to the planetary set of the variator arrangement;
a clutch of the variator arrangement transmits the engine power to the planetary set of the variator arrangement where the planetary set combines the CVP power and the engine power;
a clutch of the drop set arrangement transmits the combined CVP and engine power to the output arrangement; and
the output arrangement outputs the combined CVP and engine power as the output power;

wherein the CVP-only mode is alternately operable as a first forward mode of the CVT and a first reverse mode of the CVT by alternatively operating the CVP in forward and reverse clock directions while maintaining engagement of the clutch of the input arrangement that transmits the CVP power to the planetary set of the variator arrangement; and wherein the first forward mode and the first reverse mode of the CVT provide creeper and powered-zero operation in respective forward and reverse travel directions.

2. The CVT of claim 1, wherein the CVP includes a first continuously variable machine (CVM) and a second CVM; and
wherein the first CVM and the second CVM are electric machines.

3. The CVT of claim 2, wherein in one or more of the plurality of transmission modes, a clutch of the input arrangement transmits a portion of the engine power to the first CVM;
wherein the first CVM provides electrical power to the second CVM; and
wherein the second CVM provides the CVP power.

4. The CVT of claim 1, further including a park brake including a friction pack of interleaved plates and discs, either the plates or the discs being rotationally fixed and the other of the plates or discs being coupled to the drop set shaft for corotation about the drop set axis.

5. A multi-mode continuously variable transmission (CVT) for a work vehicle powertrain having an engine rotating an engine shaft to deliver engine power to the CVT, the CVT comprising:

a continuously variable power source (CVP) generating CVP power;

an input arrangement having an input shaft couplable to the engine shaft to receive the engine power and rotate about an input axis, the input shaft supporting one or more clutch components about the input axis;

a variator arrangement having a variator shaft rotating about a variator axis and supporting a planetary set and one or more clutch components about the variator axis;

a drop set arrangement having a drop set shaft rotating about a drop set axis and supporting one or more clutch components about the drop set axis; and an output arrangement having an output shaft rotating about an output axis and supporting one or more output components about the output shaft;

wherein the input arrangement, the variator arrangement and the drop set arrangement provide a selective gear reduction for transmission of an output power according to a plurality of transmission modes in which:

(a) in a CVP-only mode:
a clutch of the input arrangement transmits the CVP power to the planetary set of the variator arrangement;
a clutch of the variator arrangement decouples the engine power from the planetary set of the variator arrangement;
a clutch of the drop set arrangement transmits the CVP power to the output arrangement; and
the output arrangement outputs the CVP power as the output power; and (b) in a split-path mode:
a clutch of the input arrangement transmits the CVP power to the planetary set of the variator arrangement;
a clutch of the variator arrangement transmits the engine power to the planetary set of the variator arrangement where the planetary set combines the CVP power and the engine power;
a clutch of the drop set arrangement transmits the combined CVP and engine power to the output arrangement; and
the output arrangement outputs the combined CVP and engine power as the output power;

wherein the CVP includes a first continuously variable machine (CVM) and a second CVM;

wherein the first CVM and the second CVM are electric machines; and wherein the second CVM is coupled to the input arrangement by a damper mechanism, the damper mechanism including a compliant member that upon reaching a threshold torque value provides relative rotation of a first portion of the damper mechanism coupled to a component of the second CVM and a second portion of the damper mechanism coupled to a component of the input arrangement that transmits CVP power to the planetary set of the variator arrangement.

6. A multi-mode continuously variable transmission (CVT) for a work vehicle powertrain having an engine rotating an engine shaft to deliver engine power to the CVT, the CVT comprising:

a continuously variable power source (CVP) generating CVP power;

an input arrangement having an input shaft couplable to the engine shaft to receive the engine power and rotate about an input axis, the input shaft supporting one or more clutch components about the input axis;

a variator arrangement having a variator shaft rotating about a variator axis and supporting a planetary set and one or more clutch components about the variator axis;

a drop set arrangement having a drop set shaft rotating about a drop set axis and supporting one or more clutch components about the drop set axis;

an output arrangement having an output shaft rotating about an output axis and supporting one or more output components about the output shaft;

wherein the input arrangement, the variator arrangement and the drop set arrangement provide a selective gear reduction for transmission of an output power according to a plurality of transmission modes in which:

(a) in a CVP-only mode:
a clutch of the input arrangement transmits the CVP power to the planetary set of the variator arrangement;
a clutch of the variator arrangement decouples the engine power from the planetary set of the variator arrangement;
a clutch of the drop set arrangement transmits the CVP power to the output arrangement; and
the output arrangement outputs the CVP power as the output power; and (b) in a split-path mode:
a clutch of the input arrangement transmits the CVP power to the planetary set of the variator arrangement;
a clutch of the variator arrangement transmits the engine power to the planetary set of the variator arrangement where the planetary set combines the CVP power and the engine power;
a clutch of the drop set arrangement transmits the combined CVP and engine power to the output arrangement; and
the output arrangement outputs the combined CVP and engine power as the output power;

wherein the CVP includes a first continuously variable machine (CVM) and a second CVM; and wherein the first CVM and the second CVM are electric machines; and a pump drive arrangement having a hydraulic pump, which is mounted to a pump pad of a transmission housing containing, at least in part, the CVT, and a drive gear coupled to the input shaft to receive engine power from the engine to drive the hydraulic pump.

7. The CVT of claim 6, wherein the pump drive arrangement includes a first pump drive assembly and a second pump drive assembly, the first pump drive assembly including the hydraulic pump and the drive gear and the second pump drive assembly including a second hydraulic pump and a second drive gear; and wherein the second hydraulic pump is mounted to a second pump pad of the transmission housing and the second drive gear is coupled to the input shaft to receive engine power from the engine to drive the second hydraulic pump.

8. The CVT of claim 7, wherein the pump drive arrangement includes a third pump drive assembly including a third pump mounted within the transmission housing and driven by the second drive gear.

9. The CVT of claim 3, wherein the one or more clutch components of the input arrangement include a clutch C1;

wherein the clutch C1 has a component that is engaged with the second CVM continuously so as to transmit at least a portion of the CVP power to the planetary set of the variator arrangement in all modes of the CVT; and wherein the clutch C1 is engaged when in the CVP-only mode of the CVT to transmit another portion of the CVP power to the planetary set of the variator arrangement via a different component of the planetary set than the other portion of the CVP power.

10. The CVT of claim 6, wherein the one or more clutch components of the input arrangement include a clutch CR that has a component that is coupled to the input shaft for corotation with the input shaft; and wherein the clutch C1 includes a component that is coupled to a first hollow shaft supported concentrically about the input shaft for relative rotation about the input axis.

11. The CVT of claim 10, wherein the clutch C1 engages a second hollow shaft supported concentrically about the first hollow shaft for relative rotation about the input axis in one or more modes of the CVT and alternatively the clutch CR engages the second hollow shaft in one or more other modes of the CVT.

12. The CVT of claim 11, wherein the one or more clutch components of the variator arrangement include a single clutch, the single clutch being a clutch CF having a component that is coupled to the variator shaft for corotation with the variator shaft about the variator axis.

13. The CVT of claim 12, wherein the planetary set of the variator arrangement is a double planetary set having a first sun gear S1 and a first planet carrier PC1 and a second sun gear S2 and a second planet carrier PC2;

wherein the second planet carrier PC2 is coupled to the variator shaft for corotation with the variator shaft about the variator axis; and wherein the first sun gear S1 is supported concentrically about the variator shaft for relative about the variator axis and coupled to the second sun gear S2 for corotation about the variator axis.

14. The CVT of claim 13, wherein the first sun gear S1 is supported concentrically about the variator shaft and coupled for corotation with a gear meshed with a gear coupled to the clutch C1 of the input arrangement.

15. The CVT of claim 14, wherein the one or more clutch components of the drop set arrangement includes a clutch C2, a clutch C3, a clutch C4, and a clutch C5, each of the clutches C2, C3, C4, C5 having a component coupled to the drop set shaft for corotation about the drop set axis and selectively coupling the drop set shaft to the planetary set of the variator arrangement via one or more gears providing a unique gear ratio associated with one of the plurality of transmission modes.

16. The CVT of claim 15, wherein:
the clutch C2 selectively couples the drop set shaft to the planetary set of the variator arrangement via the first planet carrier PC1 to provide a second forward split-path mode or a second reverse split-path mode of the CVT;
the clutch C3 selectively couples the drop set shaft to the planetary set of the variator arrangement via a second ring gear R2 to provide a second forward split-path mode or a second reverse split-path mode of the CVT;
the clutch C4 selectively couples the drop set shaft to the planetary set of the variator arrangement via the first planet carrier PC1 to provide a third forward split-path mode or a third reverse split-path mode of the CVT; and the clutch C5 selectively couples the drop set shaft to the planetary set of the variator arrangement via the second ring gear R2 to provide a fourth forward split-path mode or a fourth reverse split-path mode of the CVT.

17. A work vehicle powertrain comprising:
an engine configured to generate rotational engine power through an engine shaft and
a multi-mode continuously variable transmission (CVT) comprising:
   a continuously variable power source (CVP) generating CVP power, wherein the CVP includes a first continuously variable machine (CVM) and a second CVM in which the first CVM and the second CVM are electric machines;
   an input arrangement having an input shaft couplable to the engine shaft to receive the engine power and rotate about an input axis, the input shaft supporting one or more clutch components about the input axis;
   a variator arrangement having a variator shaft rotating about a variator axis and supporting a planetary set and one or more clutch components about the variator axis;
   a drop set arrangement having a drop set shaft rotating about a drop set axis and supporting one or more clutch components about the drop set axis; and
   an output arrangement having an output shaft rotating about an output axis and supporting one or more output components about the output shaft;
   wherein the input arrangement, the variator arrangement and the drop set arrangement provide a selective gear reduction for transmission of an output power according to a plurality of transmission modes in which:
   (a) in a CVP-only mode:
      a clutch of the input arrangement transmits the CVP power to the planetary set of the variator arrangement;
      a clutch of the variator arrangement decouples the engine power from the planetary set of the variator arrangement;
      a clutch of the drop set arrangement transmits the CVP power to the output arrangement; and
      the output arrangement outputs the CVP power as the output power; and
   (b) in a split-path mode:
      a clutch of the input arrangement transmits the CVP power to the planetary set of the variator arrangement;
      a clutch of the variator arrangement transmits the engine power to the planetary set of the variator arrangement where the planetary set combines the CVP power and the engine power;
      a clutch of the drop set arrangement transmits the combined CVP and engine power to the output arrangement; and
      the output arrangement outputs the combined CVP and engine power as the output power; and
a pump drive arrangement including:
   a first pump drive assembly having a first hydraulic pump and a first drive gear, the first hydraulic pump being mounted to a first pump pad of the transmission housing and the first drive gear being coupled to the input shaft to receive engine power from the engine to drive the first hydraulic pump;
   a second pump drive assembly including a second hydraulic pump and a second drive gear, the second hydraulic pump being mounted to a second pump pad of the transmission housing and the second drive gear being coupled to the input shaft to receive engine power from the engine to drive the second hydraulic pump; and
   a third pump drive assembly including a third pump mounted within the transmission housing and driven by the second drive gear.

* * * * *